(12) United States Patent
Wheeler et al.

(10) Patent No.: US 12,033,479 B2
(45) Date of Patent: Jul. 9, 2024

(54) PRODUCT MERCHANDISING DISPLAY SYSTEM

(71) Applicant: Mobile Tech, Inc., Hillsboro, OR (US)

(72) Inventors: Wade Carter Wheeler, Hillsboro, OR (US); Lincoln Wilde, Hillsboro, OR (US); Eric Charlesworth, Hillsboro, OR (US); Jude A. Hall, Hillsboro, OR (US); Steven R. Payne, Hillsboro, OR (US); Rod Horner, Hillsboro, OR (US)

(73) Assignee: Mobile Tech, Inc., Hillsboro, OR (US)

( * ) Notice: Subject to any disclaimer, the term of this patent is extended or adjusted under 35 U.S.C. 154(b) by 416 days.

(21) Appl. No.: 17/431,413

(22) PCT Filed: Feb. 18, 2020

(86) PCT No.: PCT/US2020/018644
§ 371 (c)(1),
(2) Date: Aug. 16, 2021

(87) PCT Pub. No.: WO2020/172166
PCT Pub. Date: Aug. 27, 2020

(65) Prior Publication Data
US 2022/0122433 A1 Apr. 21, 2022

Related U.S. Application Data

(60) Provisional application No. 62/807,636, filed on Feb. 19, 2019.

(51) Int. Cl.
*G06Q 10/08* (2024.01)
*A47F 3/00* (2006.01)
(Continued)

(52) U.S. Cl.
CPC .......... *G08B 13/1409* (2013.01); *A47F 3/002* (2013.01); *A47F 5/0087* (2013.01);
(Continued)

(58) Field of Classification Search
CPC ............... G08B 13/14; G08B 13/1409; G08B 13/1463; G08B 13/1445; G08B 13/1418; G08B 13/149; G08B 13/02; G08B 13/1454; G08B 13/1472; G08B 25/014; G08B 25/10; G06F 1/1626; G06F 1/1632; G06F 1/16; F16M 11/041; F16M 11/105; F16M 13/02; F16M 2200/068; F16M 11/14; F16M 2200/021; F16M 11/046; F16M 11/12; F16M 11/40; F16M 13/00; F16M 2200/02; F16M 2200/065; E05B 73/0017; E05B 73/0082; E05B 73/0005; E05B 73/0011; E05B 73/00; A47F 2010/005;
(Continued)

(56) References Cited

U.S. PATENT DOCUMENTS 10,258,172 B2 * 4/2019 Grant ................. G08B 13/1445
11,221,101 B2 * 1/2022 Yang .................... F16M 11/046
(Continued)

*Primary Examiner* — Dionne Pendleton

(57) ABSTRACT

Disclosed herein are a number of example embodiments for product merchandising display systems. Through such example embodiments, products (e.g., smart phones, tablet computers, wearables, digital cameras, etc.) can be securely merchandised to customers in retail store environments.

10 Claims, 24 Drawing Sheets

PERSPECTIVE VIEW
SIDE

(51) Int. Cl.
*A47F 5/00* (2006.01)
*E05B 73/00* (2006.01)
*G08B 13/14* (2006.01)
*H04W 4/029* (2018.01)
*H04W 56/00* (2009.01)
*A47F 10/00* (2006.01)

(52) U.S. Cl.
CPC .......... *E05B 73/00* (2013.01); *E05B 73/0017* (2013.01); *A47F 2010/005* (2013.01)

(58) Field of Classification Search
CPC ........ A47F 3/002; A47F 5/0087; A47F 7/024; A47F 5/0081; A47F 7/00; A47F 7/0246; A47F 10/00; A47F 2003/008; A47F 3/001; A47F 3/004; A47F 3/007; A47F 7/022; Y10S 273/26; H02J 50/12; H02J 50/90; H02J 7/0044; H02J 7/0045; H01R 13/514; H01R 13/641; H01R 13/66; H01R 13/6658; H01R 13/70; H01R 13/7135; H01R 13/717; H01R 25/00; H01R 25/003; H01R 29/00; H01R 35/025; H01R 35/04; H01B 11/06; H01B 11/08; H01B 11/1091; H01B 7/041; H01B 7/0892; A63B 71/06; A47B 13/00; H05K 1/0296; H04W 4/026; H04W 56/0025; H04W 84/18; H04W 4/70; H04L 67/01; H04L 67/04; H04L 67/12; H04L 67/303; H04L 67/52; H04L 67/75; G06Q 10/087; G06Q 20/203; G06Q 99/00

See application file for complete search history.

(56) References Cited

U.S. PATENT DOCUMENTS

2011/0309934 A1* 12/2011 Henson .............. G08B 13/1472
340/568.8
2021/0131149 A1* 5/2021 Miles ........................ A47F 7/00

* cited by examiner

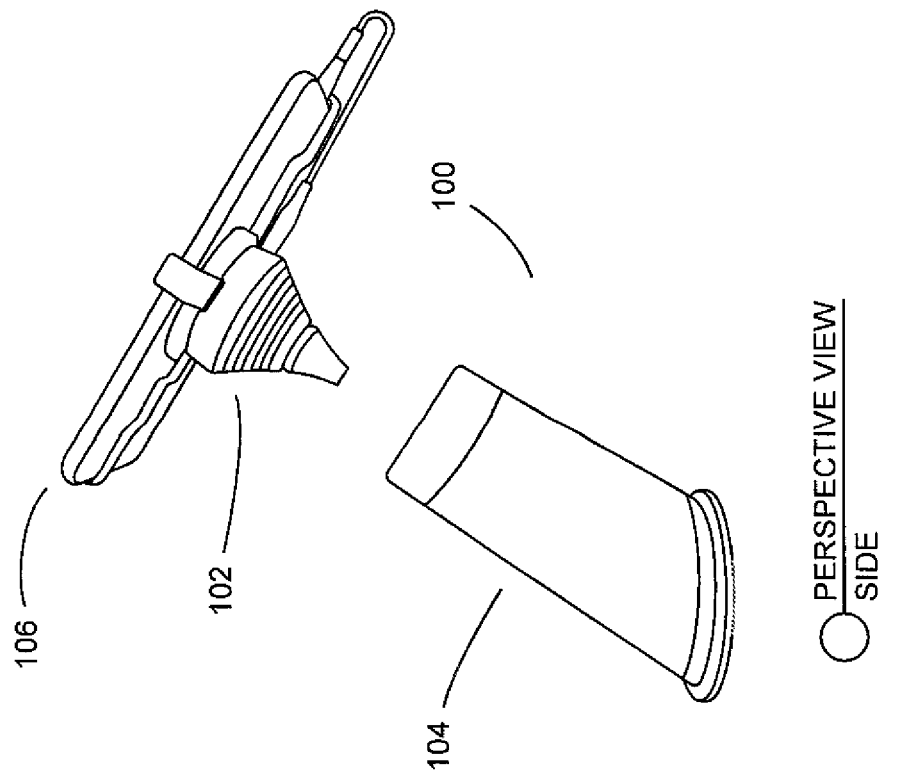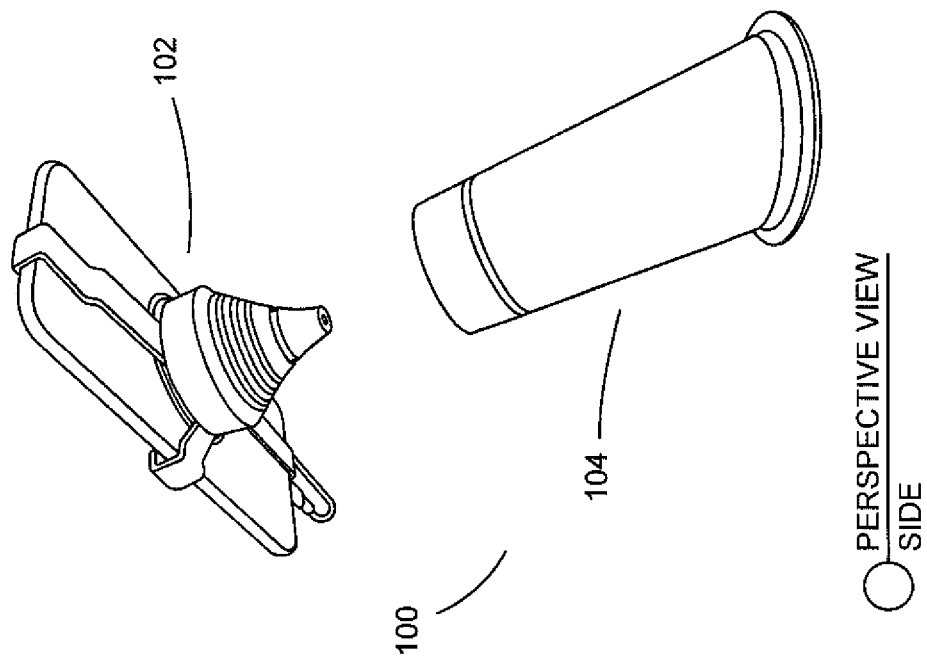
FIGURE 6

Product Merchandising System (100a)

Receive puck assembly identifier, where puck assembly identifier identifies features and capabilities of the puck assembly (e.g., software/firmware version number, whether puck has wireless connectivity chip, whether puck includes sensor circuit (e.g., RFID reader), supported communication protocol for puck interface, alarm capabilities for puck, etc.)

↓

Receive base assembly identifier, where base assembly identifier identifies features and capabilities of the base assembly (e.g., software/firmware version number, whether base has wireless connectivity chip, whether base includes sensor circuit (e.g., RFID reader), etc.)

↓

Wirelessly transmit puck assembly identifier and base assembly identifier to remote compute system

Product Merchandising System (100n)

Receive puck assembly identifier, where puck assembly identifier identifies features and capabilities of the puck assembly (e.g., software/firmware version number, whether puck has wireless connectivity chip, whether puck includes sensor circuit (e.g., RFID reader), supported communication protocol for puck interface, alarm capabilities for puck, etc.)

↓

Receive base assembly identifier, where base assembly identifier identifies features and capabilities of the base assembly (e.g., software/firmware version number, whether base has wireless connectivity chip, whether base includes sensor circuit (e.g., RFID reader), etc.)

↓

Wirelessly transmit puck assembly identifier and base assembly identifier to remote compute system

Remote Computer System

Receive wirelessly transmitted puck and base assembly identifiers

↓

Build data structure that tracks the components and component capabilities of the product merchandising systems Data Record:

| System ID | Puck ID | Base ID | Puck SW/FW Version | Base SW/FW Version | Wireless Puck? | Wireless Base? | Puck Sensor | Base Sensor | Puck Protocol | ... |
|---|---|---|---|---|---|---|---|---|---|---|
| Post Pos'n 1 | abc | def | 2.4 | 2.7.6 | Yes | No | RFID | NA | USB | ... |
| Post Pos'n n | bcd | efg | 2.3 | 2.6.8 | No | Yes | NA | NFC | USB | ... |

Figure 16

PRODUCT MERCHANDISING DISPLAY SYSTEM

CROSS-REFERENCE TO RELATED PATENT APPLICATIONS

This patent application claims priority to PCT/US20201018644, filed Feb. 18, 2020, which claims priority to U.S. provisional patent application Ser. No. 62/807,636, filed Feb. 19, 2019, the entire disclosure of which is incorporated herein by reference.

INTRODUCTION

Disclosed herein are a number of example embodiments for product merchandising display systems. Through such example embodiments, products such as electronic devices (e.g., smart phones, tablet computers, wearables, digital cameras, etc.) can be securely merchandised to customers in retail store environments.

For example, an example embodiment disclosed herein is a product merchandising display system comprising: (1) a puck assembly for mounting a product, and (2) a base assembly, wherein the puck assembly is moveable between (1) a rest position in which the puck assembly rests on the base assembly and (2) a lift position in which the puck assembly is lifted from the base assembly, wherein the puck assembly includes a first portion and a second portion, wherein the first portion is detachable from the second portion, wherein the first portion includes a surface for mounting the product, and wherein the second portion includes a surface that contacts the base assembly when the puck assembly is in the rest position. The second portion can serve as the lower portion for the puck assembly, and it can include circuitry for one or puck operations, such as power distribution, security, wireless communications, and/or sensing authorization credentials, etc. The first portion can serve as the upper portion of the puck assembly, and it can omit any circuitry so that it can be a low cost item that serves as a mounting platform for the product. Adhesive can be applied to the mounting surface for reliably mounting the product on the puck assembly, and as new products are re-merchandised on the system, the first portion can be readily detached from the lower portion and swapped out for a new first portion to be attached to the second portion along with the new product if desired. The inventors note that the use of the first and second detachable portions for the puck assembly provides retail stores with improved speed and cost of re-merchandising because the first portion can be easily swapped out for a new first portion while retaining the same second portion as new products are merchandised by the product merchandising display system.

As another example embodiment, disclosed herein is a product merchandising display system comprising (1) a puck assembly comprising a plurality of modular components for mounting a product with different levels of security, the modularly combinable components including a first mounting option for the product and a second mounting option for the product, wherein each mounting option is detachably connectable with a lower portion of the puck assembly, and (2) a base assembly, and wherein the puck assembly is moveable between (1) a rest position in which the puck assembly rests on the base assembly and (2) a lift position in which the puck assembly is lifted from the base assembly. As examples, the first mounting option may comprise a disk having an adhesive mounting surface for the product, and the second mounting option may comprise a bracket for securing the product.

As still another example embodiment, disclosed herein is tracking system for electronically tracking a plurality of components of a product merchandising display system, the tracking system comprising (1) the product merchandising display system, wherein the product merchandising display system comprises (i) a puck assembly for mounting a product, and (ii) a base assembly, wherein the puck assembly comprises a first interface, wherein the base assembly comprises a second interface, wherein the puck assembly is moveable between (i) a rest position in which the puck assembly rests on the base assembly and (ii) a lift position in which the puck assembly is lifted from the base assembly, and wherein the first and second interfaces are positioned to engage with each other when the puck assembly is in the rest position to provide a path for a data transfer between the base assembly and the puck assembly, the product merchandising system further comprising a wireless transceiver, and (2) a computer system remote from the product merchandising system, and wherein wireless transceiver is configured to (1) collect an identifier for the puck assembly and an identifier for the base assembly, and (2) wirelessly communicate the collected identifiers to the remote computer system.

As another example embodiment, disclosed herein is a product merchandising display system comprising (1) a puck assembly for mounting a product, (2) a base assembly, and (3) a tether assembly that is adapted to tether the puck assembly to the base assembly, wherein the tether assembly comprises a (1) retractable tether and (2) a fitting at an end of the tether for connection with the puck assembly, wherein the puck assembly is moveable between (1) a rest position in which the puck assembly rests on the base assembly and (2) a lift position in which the puck assembly is lifted from the base assembly, and wherein the base assembly comprises a lock that is switchable between a locked state and an unlocked state, wherein the lock is configured to (1) engage with the fitting when in the locked state to prevent extension of the tether and (2) not engage with the fitting when in the unlocked state to permit extension of the tether.

As another example embodiment, disclosed herein is a product merchandising display system comprising (1) a puck assembly for mounting a product, and (2) a base assembly, wherein the puck assembly is moveable between (1) a rest position in which the puck assembly rests on the base assembly and (2) a lift position in which the puck assembly is lifted from the base assembly, wherein the base assembly comprises a base conductive contact, wherein the puck assembly comprises a puck conductive contact ring, wherein the base conductive contact and the puck conductive contact ring are positioned to engage with each other when the puck assembly is in the rest position, wherein the puck assembly and base assembly include circuitry that are configured to transfer power and/or data from the base assembly to the puck assembly via the engagement of the base conductive contact with the puck conductive contact ring when the puck assembly is in the rest position, and wherein the conductive contact ring is arranged and positioned to engage with the base conductive contact at a plurality of rotational orientations of the puck assembly relative to the base assembly when the puck assembly is in the rest position.

As yet another example embodiment, disclosed herein is a product merchandising display system comprising (1) a puck assembly for mounting a product, (2) a base assembly, and (3) a tether assembly that is adapted to tether the puck assembly to the base assembly, wherein the tether assembly comprises a (1) retractable tether and (2) a fitting at an end of the tether for connection with the puck assembly, wherein the puck assembly is moveable between (1) a rest position in which the puck assembly rests on the base assembly and (2) a lift position in which the puck assembly is lifted from the base assembly, wherein the base assembly comprises a riser assembly and a riser cup, wherein the riser cup is detachably connectable with the riser assembly, wherein the riser cup includes a recess for seating a portion of the puck assembly when the puck assembly is in the rest position, wherein the puck assembly comprises a first interface located on the puck assembly portion, wherein the riser cup comprises a second interface located on a surface of the riser cup exposed to the recess, and wherein the first and second interfaces are positioned to engage with each other when the puck assembly is in the rest position to provide a path for at least one of (1) a power transfer from the base assembly to the puck assembly, and/or (2) a data transfer between the base assembly and the puck assembly.

As yet another example embodiment, disclosed herein is a product merchandising display system comprising (1) a puck assembly for mounting a product, (2) a base assembly, and (3) a tether assembly that is adapted to tether the puck assembly to the base assembly, wherein the tether assembly comprises a (1) retractable tether and (2) a fitting at an end of the tether for connection with the puck assembly, wherein the puck assembly is moveable between (1) a rest position in which the puck assembly rests on the base assembly and (2) a lift position in which the puck assembly is lifted from the base assembly, wherein the base assembly comprises a riser and a riser sleeve, wherein the riser includes an access point for accessing an interior portion of the riser, and wherein the riser sleeve is adapted to cover the access point.

These and other features and advantages of the present invention will be described hereinafter to those having ordinary skill in the art.

BRIEF DESCRIPTION OF THE DRAWINGS

FIG. 6 shows additional example views of an example embodiment of a product merchandising system.

FIG. 16 shows an example process flow electronic serialization/tracking operations.

DETAILED DESCRIPTION OF EXAMPLE EMBODIMENTS

Figure 1A:
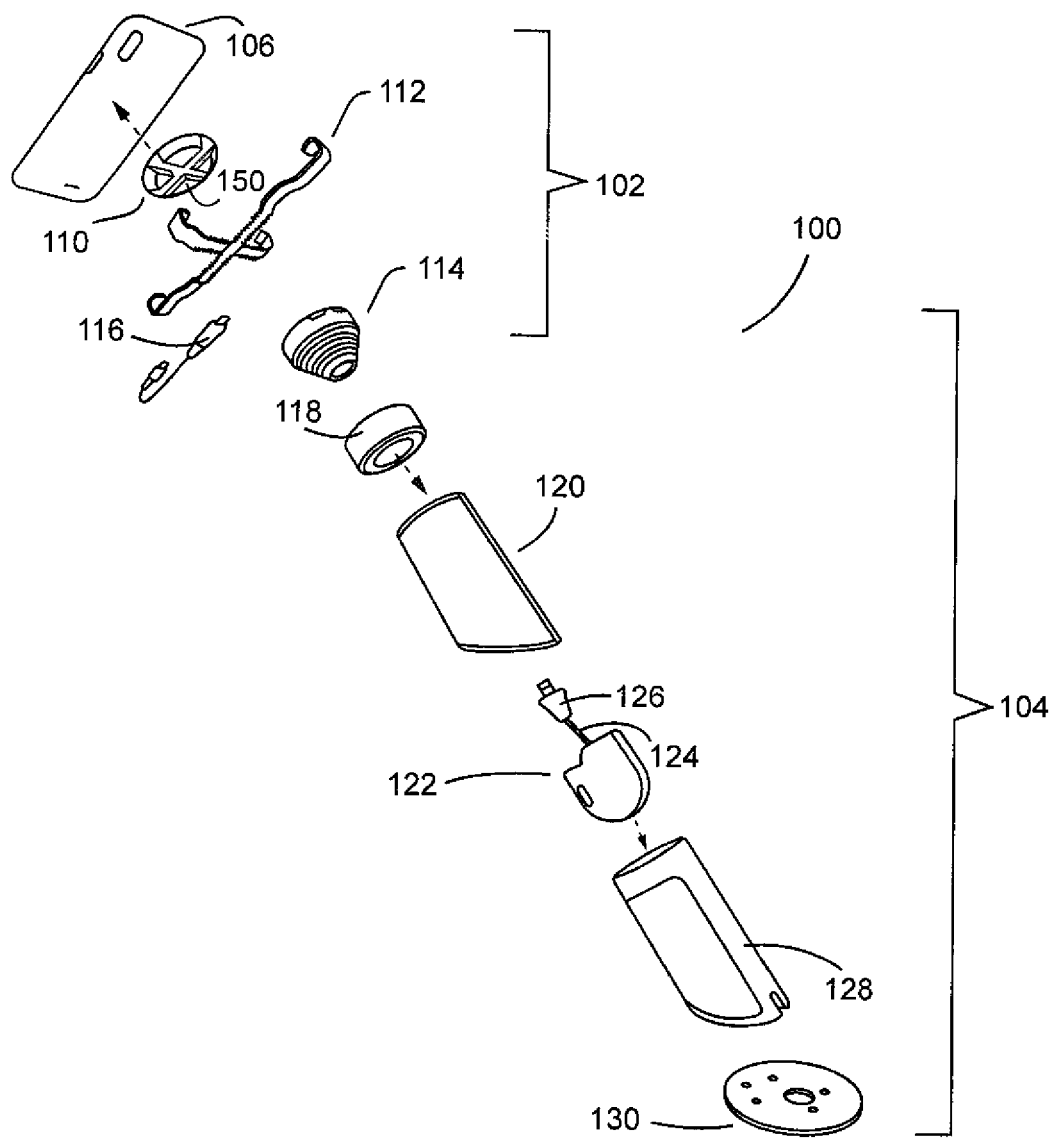
FIGS. 1A and 1B show exploded views an example embodiment of a product merchandising system.
Figure 1B:
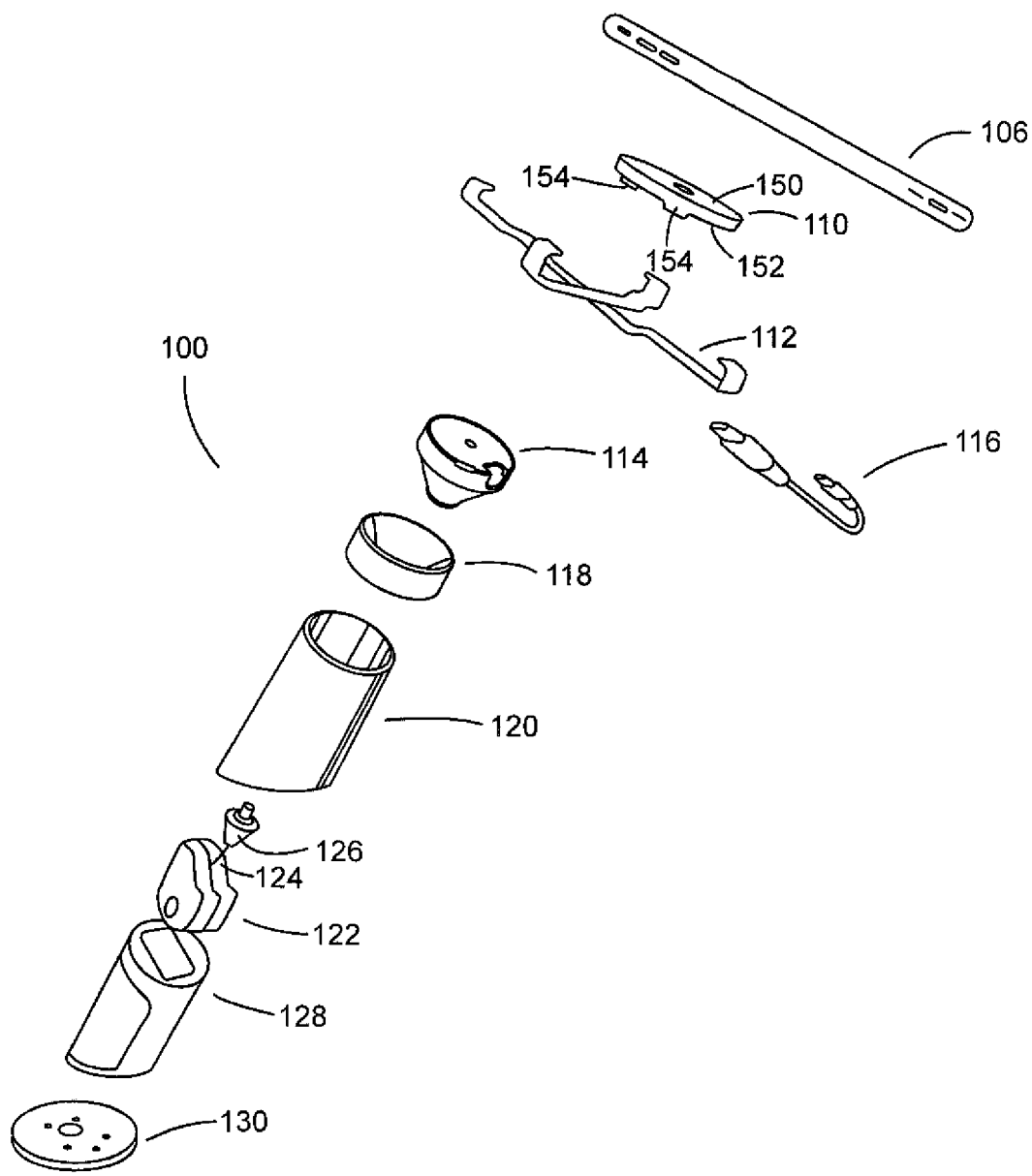

FIG. 1A shows a first exploded view an example embodiment of a product merchandising system 100. FIG. 1B shows a second exploded view the product merchandising system 100 of FIG. 1A from a different perspective. System 100 can serve as a retail position, such as a post position, in a retail store for presenting a product to customers. The system 100 may include a puck assembly 102 and a base assembly 104. Product 106, such as an electronic device (e.g., a smart phone, tablet computer, wearable (e.g., smart watch), digital camera, etc.) can be mounted on the puck assembly 102 so that the product 106 can be merchandised to customers. The puck assembly 102 can moveable between (1) a rest position in which the puck assembly 102 rests on the base assembly 104 and (2) a lift position in which the puck assembly 102 is lifted from the base assembly 104. The system 100 may also include a tether assembly 122 that is capable of tethering the puck assembly 102 to the base assembly 104. Tether assembly 122 may include a retractable tether 124 that is capable of spooling and unspooling via a recoiler to permit extension and retraction of the tether 124. One end of the tether 124 may include a fitting 126 that is adapted for detachable connection with the puck assembly 102.

In the example of FIGS. 1A and 1B, puck assembly 102 includes a first portion 110 and a second portion 114 that are detachably connected with each other. First portion 110 includes a first surface for mounting the product 106. The first portion 110 may also include a second surface for engaging with the second portion 114 when they are detachably connected with each other.

To mount the product 106 to the puck assembly 102, an adhesive such as a Very High Bond (VHB) material is often applied to the surface of the puck assembly 102 on which the product 106 is mounted. When products 106 are sold from the post position over time, it is often the case where the adhesive and its removal from the puck assembly 102 to detach product 106 lead to a degradation of the puck assembly 102 over time. However, it may be the case that the puck assembly 102 houses several functional components that may be relatively expensive, such as electronics. In order to increase the longevity of these expensive components of the puck assembly, the example of FIGS. 1A and 1B is designed so that the first portion 110 (which may have the adhesive applied thereto) can be a low cost consumable item that can be replaced at very low cost, while the second portion 114 houses the relatively expensive functional components of the puck assembly 102. In this fashion, if a buildup of adhesive on the first surface of first portion 110 causes a store employee to desire a cleaner mounting surface, the store employee can detach the first portion 110 from the second portion 114, and then attach a new first portion 110 to the existing second portion 114. In this fashion, the system can avoid unnecessary replacements of the internal components of second portion 114. Thus, not only does the detachability of the first portion from the second portion lead to significant improvements in the speed of re-merchandising as a given post position is re-used to merchandise a new product; but the low nature of the first portion also improves the cost of re-merchandising for retailers because they can reduce the frequency by which the relatively expensive components of the puck assembly will need to be replaced.

In an example embodiment, the first portion 110 can be designed to not include any electronics (and where the electronics for the puck assembly 102 are housed in the second portion 114). For example, first portion 110 can be a disk or the like formed from a plastic or other suitable material. Furthermore, as shown by FIGS. 1A and 1B, the first portion 110 may exhibit a form factor such that its lateral dimensions (e.g., diameter) are substantially the same as the lateral dimensions (e.g., diameter) of the second portion 114. In this fashion, the puck assembly 102 can exhibit a largely uniform outer shape in the area where the first and second portions 110 and 114 are attached to each other (e.g., see FIG. 5).

Also, as shown by FIGS. 1A and 1B, the first portion 110 can have an upper side 150 that serves as the surface on which the product is mounted. First portion 110 can also have a lower side 152 that is opposite the upper side 150, where the lower side 152 engages the second portion 114 when the first and second portions 110 and 114 are connected to each other. As noted below, the lower side 152 can be shaped to provide for detachable connectability with the lower portion 114. Thus, it should be understood that first portion 110 can serve as an upper portion for the puck assembly 102, and second portion 114 can serve as a lower portion for the puck assembly 102, as shown by FIGS. 1A and 1B.

The detachable connection between the first portion 110 and second portion 114 can be accomplished via any of a number of techniques. For example, a quick connect feature can be provided for providing fast connection and disconnection between the first portion 110 and second portion 114. The quick connect feature can be designed to permit attachment and/or detachment of the first and second portions 110/114 via manual interaction with the portions 110/114. The quick connect feature can also be designed to permit attachment and/or detachment of the first and second portions 110/114 such that a tool is required to mechanically connect or disconnect the portions 110/114. The quick connect feature can also be designed to permit attachment and/or detachment of the first and second portions 110/114 in response to an electronic control signal from a circuit.

Figure 2A:
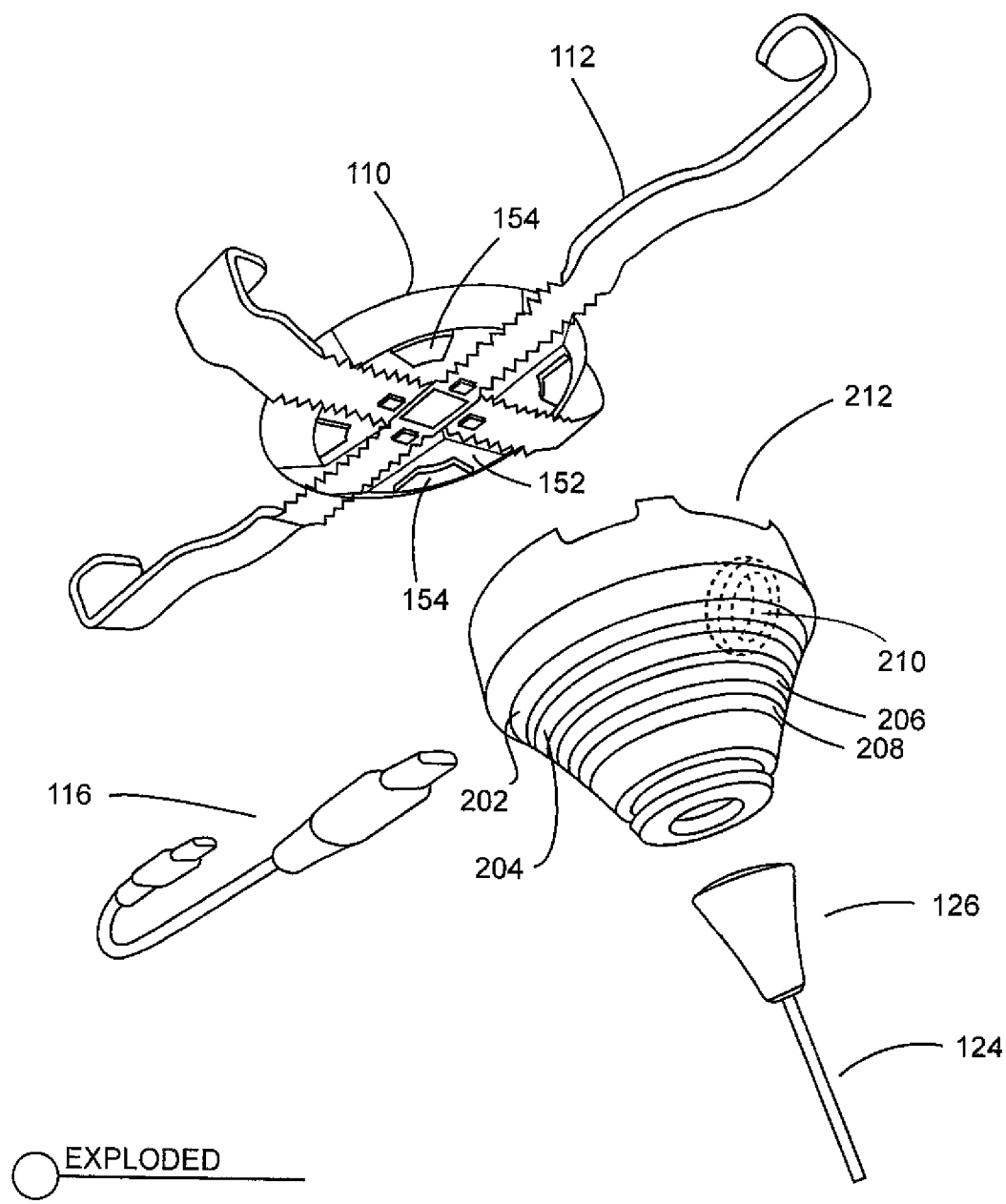
FIGS. 2A-2D show example views of various aspects of an example embodiment of a product merchandising system.
Figure 2B:
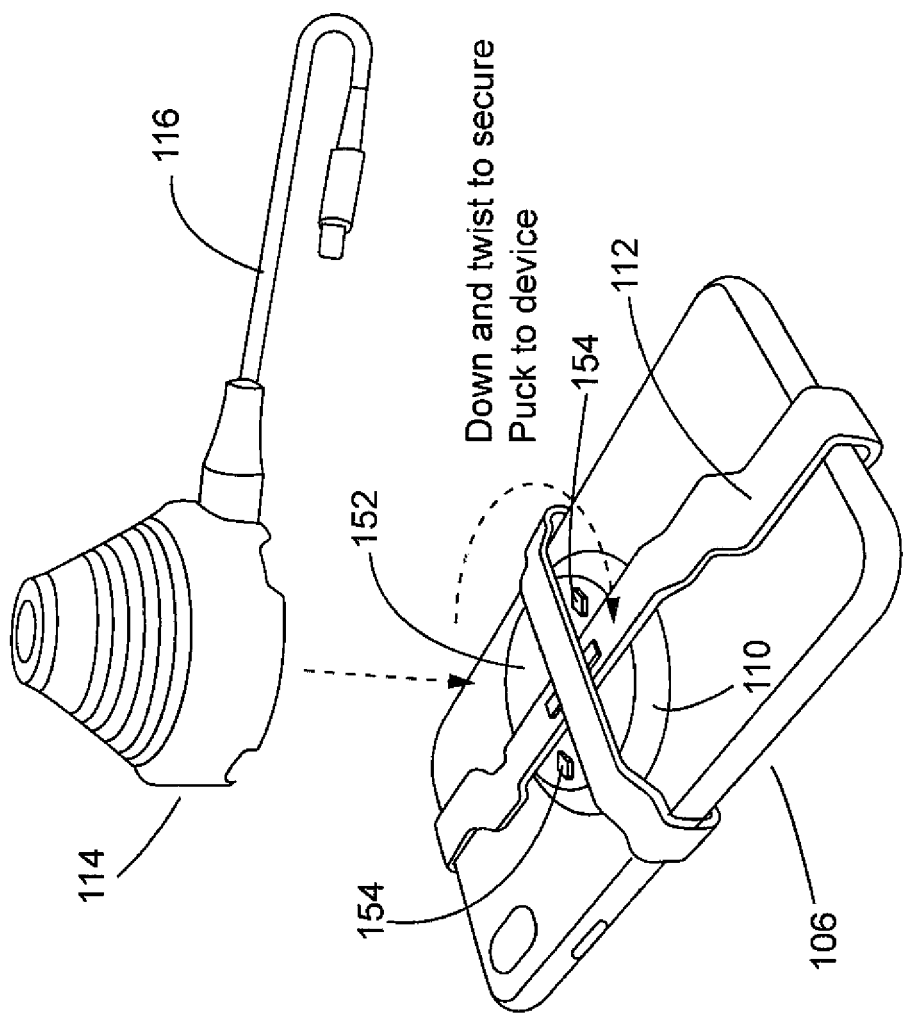

As an example of a quick connect feature, the first and second portions 110 and 114 can include projections and recesses that mate with each other when a particular alignment between the recesses and projections is achieved, whereupon a rotational force applied to the first or second portion 110/114 can slide the first and second portions 110/114 into a fitted connection with each other (see FIG. 2B which shows how the puck assembly's second portion 114 can be brought down into alignment with first portion 110 and rotated/twisted to create a connection between portions 110 and 114). The same procedure in reverse could then be used to detach the first portion 110 from the second portion 114. As an example, such projections and recesses can take the form of tongues and grooves that will create a mechanical interlocking when the first portion 110 is connected to the second portion 114. For example, lower side 152 of the first portion 110 can include a plurality of tongues (e.g., see 154 in FIG. 1B), and the upper surface of second portion 114 can include grooves that receive the tongues when first portion 110 is properly rotated into place on the second portion 114. The tongues can be shaped to include a wide lower portion that is dimensioned to fit within a wide groove formed into the upper surface of second portion 114 and a narrower upper portion that is dimensioned to fit within a narrower groove formed into the upper surface of second portion 114 (where this narrower groove is adjacent the wider groove). In this fashion, the tongues can be inserted into the wider grooves, whereupon the first portion 110 is rotated relative to the second portion 114 to cause the tongue to slide into an alignment where the narrower tongue portions fit within the narrow grooves. When in this alignment, the wider tongue portions will thus block vertical separation of the first portion 110 from the second portion 114. In another example embodiment, the tongues can be included as part of the second portion 114, and the grooves can be included as part of the first portion 110.

As noted above, a practitioner may choose to design the quick connect feature so that a tool is needed to operate on the first and/or second portions 110, 114 to permit detachment of the first portion 110 from the second portion 114 via counter-rotation. For example, a spring-biased component of the puck assembly 102 can block counter-rotation of the first portion 110 relative to the second portion 114 when the component is in a locked position; and a tool can interact with this component to adjust it to an unlocked position where it no longer blocks counter-rotation of the first portion 110 relative to the second portion 114. In this fashion, the tool can be used to apply a force to the component that overcomes the bias force of the spring and move the component from its default locked position to its unlocked position.

In another example embodiment, a tool can be used to interact with tongues and grooves that are included as parts of the first and second portions 110, 114 (such as by applying a force onto a tongue that releases the mechanical engagement). Such a tool can access the tongue via an access port that is specially shaped to accommodate a shape of the tool.

As another example of a quick connect feature, the detachable connection between the first and second portions 110/114 can be controlled via an electronic control signal. For example, a circuit can actuate an electronic lock that engages the first portion 110 with the second portion 114. Based on the value of this control signal, the electronic lock can create the engagement or permit disengagement of the first portion 110 from the second portion 114. The control signal can be triggered by any of a number of techniques, such as the detection by system 100 of an authorized security fob, the receipt of a signal from a remote computer system, etc.

The system 100 may also include a bracket 112 for securing the product 106 to the puck assembly 102. For example, the bracket 112 can include multiple arms arranged in a cross pattern as shown by FIG. 1 (e.g., a 4-point bracket). However, it should be understood that other designs for bracket 112 could be employed. Bracket 112 can also be removable from the system 100. Bracket 112 can be positioned in system 100 such that it is located between the first and second portions 110/114. To accommodate the bracket 112, the first portion 110 may include a recess on the surface opposite its product-mounting surface, where this recess is shaped to fit at least a portion of the bracket 112 (e.g., see FIGS. 2A and 2B). The second portion 114 may also include a recess on the surface opposite its product-mounting surface, where this recess is shaped to fit at least a portion of the bracket 112. Further still, both first and second portions 110 and 114 may include recesses that are shaped to fit portions of the bracket 112. Accordingly, if a practitioner wants to include bracket 112 in system 100, he or she can sandwich the bracket 112 between the first and second portions 110 and 114, and then detachably connect the first portion 110 with the second portion 114 while the bracket 112 is so positioned. If a practitioner does not want include the bracket 112 in system 100, the first and second portions 110 and 114 can be detachably connected when bracket 112 is not present between them.

Accordingly, it should be understood that the bracket 112 can be detachably connected with the puck assembly 102, and the puck assembly 102 is capable of being used with or without the bracket 112. In this fashion, the puck assembly 102 can include modularly combinable components that permit the same post position to be used by retailers for different merchandising scenarios (e.g., different product types and/or different levels of security). If a merchant is less concerned about potential theft and wants the product to be merchandised to the customer in a manner that provides the customer with easy handling of the product, the merchant can choose to omit the bracket 112 from the system 100. For example, with a system 100 where the puck assembly 102 includes first and second portions 110, 114, these first and second portions 110, 114 can be connected to each other without a bracket 112 sandwiched between them. But, if a merchant is concerned about potential theft and wants to have the added security provided by bracket 112, the merchant can choose to connect the bracket 112 to the puck assembly 102 without needing to fully replace the post position. For example, with a system 100 where the puck assembly 102 includes first and second portions 110, 114, the bracket 112 can be sandwiched between these first and second portions 110, 114 to modularly add extra security to the post position. Thus, the modularly combinable components permit a given post position to be used with multiple levels of mounting security (e.g., any combination of mounting via adhesive only, mounting via brackets, mounting via adhesive and brackets, etc.).

As noted above, second portion 114 can be designed to carry the electronics of the puck assembly 102. In the example of FIG. 1, second portion 114 can exhibit an upper portion that is shaped in a manner similar to first portion 110. Second portion 114 can also include a lower portion that engages with the base assembly 104 when the puck assembly 102 is in the rest position. This lower portion can exhibit a frustoconical shape, as shown by FIGS. 1A-1B and 2A-2D. However, it should be understood that this is only an example, and the lower portion of second portion 114 could exhibit other shapes if desired (e.g., a disk shape or the like).

Second portion 114 may carry electronics such as a security circuit that can be configured to trigger an alarm signal in response to detection of an unauthorized removal or disconnection of the product 106 from the puck assembly 102. The second portion 114 may also include a plunger switch that extends to the mounting surface of the puck assembly 102, wherein the plunger switch is depressed when the product 106 is mounted on the puck assembly 102 and released when the product 106 is removed from the puck assembly 102. In such an example, the first portion 110 may include an aperture through which the plunger extends for engaging with the product 106. Such a plunger arrangement can permit detection of whether the product 106 is mounted on the puck assembly 102. In another example embodiment, an optical sensor can be used in place of a plunger. The second portion 114 may also include a port 220 (see FIG. 2D) for receiving an electronic cable 116, such as a power cable. As an example, the cable 116 can have standardized connectors at one or both ends (e.g., a USB-C connector). One end of the cable 116 can be detachably connected with the puck assembly 102 via port 220, and other end of cable 116 can be detachably connected with the product 106. The security circuit can also detect if this cable 116 is connected, and it may trigger an alarm signal if an unauthorized disconnection of cable 116 is detected.

Second portion 114 may also include a power distribution circuit that parcels out power received from the base assembly 104 for distribution to access port 220 (for charging product 106 via cable 116), to the other circuit functions carried by the second portion 114, and/or to a rechargeable battery housed by second portion 114. Such a battery can then be used to power the puck assembly circuitry when the puck assembly is in the lift position. Examples of such security and power distribution circuitry are described in U.S. Pat. Nos. 8,558,688, 8,698,617, 8,698,618, 9,786,140, 10,026,281, and 10,083,583, the entire disclosures of each of which are incorporated herein by reference. The power distribution circuit may receive power from the base assembly 104 via a plurality of charge contacts as described by the above-referenced and incorporated U.S. Pat. Nos. 8,698, 617, 8,698,618, 9,786,140, 10,026,281, and 10,083,583. However other modes of power delivery can be employed if desired by a practitioner, such as inductive charging as discussed in the above-referenced and incorporated U.S. Pat. No. 8,558,688.

Second portion 114 can also include a sensor circuit for sensing a security fob carried by store personnel, where such sensor circuit can be configured to detect authorization credentials carried by the security fob to support a determination as to whether the security fob is authorized to control a state of the system 100. As an example, this sensor circuit can take the form of an RFID reader 210 (see FIG. 2A). However, it should be understood that other sensing modalities can be employed, such as optical receivers or transceivers (e.g., an infrared transceiver), a NFC sensor, etc. Examples of technologies that can be employed by sensor circuit to support access control for the system 100 are described in U.S. Pat. Nos. 9,892,604, 9,959,432, and 10,157,522, the entire disclosures of each of which are incorporated herein by reference.

Second portion 114 can also include a wireless connectivity circuit that wirelessly connects the system 100 with a remote computer system. For example, the second portion can include a wireless transceiver that connects the second portion 114 with a wireless network such as a wireless mesh network through which the second portion can wirelessly communicate with the remote computer system. For example, a wireless RF chip such as an Atmel wireless chip could be used for the wireless transceiver. Examples of technologies that can be employed to provide such wireless connectivity are described in U.S. Pat. App. Pub. Nos. 2017/0164314, 2018/0007648, 2018/0288720, 2018/0288721, and 2018/0288722, the entire disclosures of each of which are incorporated herein by reference.

Further still, the second portion 114 may also include one or more lights, such as LEDs 212 (see FIG. 2A), that are illuminated to show an operational status for the system (e.g., armed, disarmed, alarming, charging, etc.). The second portion 114 may also include one or more piezo elements that are triggered to product alarm outputs in the event of an alarm signal being triggered.

FIG. 2A shows an example embodiment of the second portion 114 in greater detail. In the example of FIG. 2A, the lower part of the second portion 114 exhibits a frustoconical shape. However, as noted above, the lower part could exhibit other shapes if desired by a practitioner. The lower part of the second portion 114 (which may exhibit a frustoconical or other shape) can include a power interface and/or a data interface for the puck assembly 102. In an example embodiment, the second portion 114 includes both a power interface and a data interface. These power and data interfaces can be positioned on the second portion 114 to engage with corresponding power and data interfaces resident on the base assembly 104 so that the interfaces engage with each other when the puck assembly 102 is in the rest position. Accordingly, the engagement of the puck's power interface with the base's power interface provides a path for transferring power from the base assembly 104 to the puck assembly 102. Moreover, the engagement of the puck's data interface with the base's data interface provides a path for communicating data between the base assembly 104 and the puck assembly 102. The data path may be a bi-directional data path that allows for a transfer of data from the puck assembly 102 to the base assembly 104 and from the base assembly 104 to the puck assembly 102.

In an example embodiment, these power and data interfaces can take the form of wireless power and data interfaces as described in (1) U.S. provisional patent application Ser. No. 62/799,566, filed Jan. 31, 2019, and entitled "Methods and Apparatuses for Wireless and Non-Conductive Power and Data Transfers with Electronic Devices", (2) U.S. provisional patent application Ser. No. 62/912,749, filed Oct. 9, 2019, and entitled "Methods and Apparatuses for Wireless and Non-Conductive Power and Data Transfers with Electronic Devices", and (3) PCT patent application serial no. PCT/US2019/015914, filed Jan. 30, 2020, and entitled "Methods and Apparatuses for Wireless and Non-Conductive Power and Data Transfers with Electronic Devices", the entire disclosures of each of which are incorporated herein by reference. For example, the power interface may employ inductive charging coils located in the second portion 114 and base assembly 104.

Figure 2C:
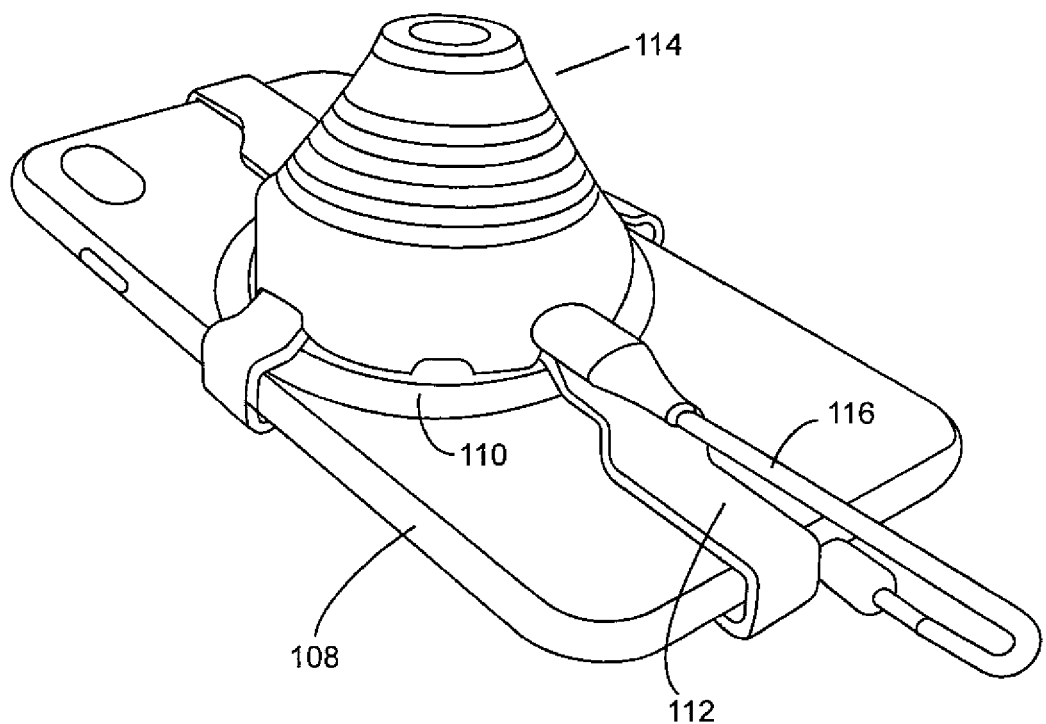
Figure 2D:
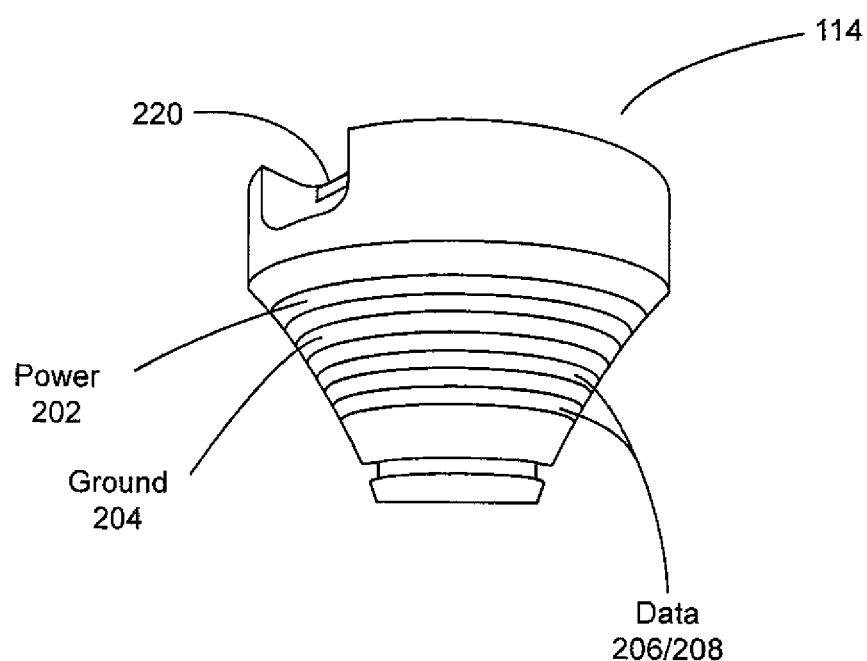
Figure 3A:
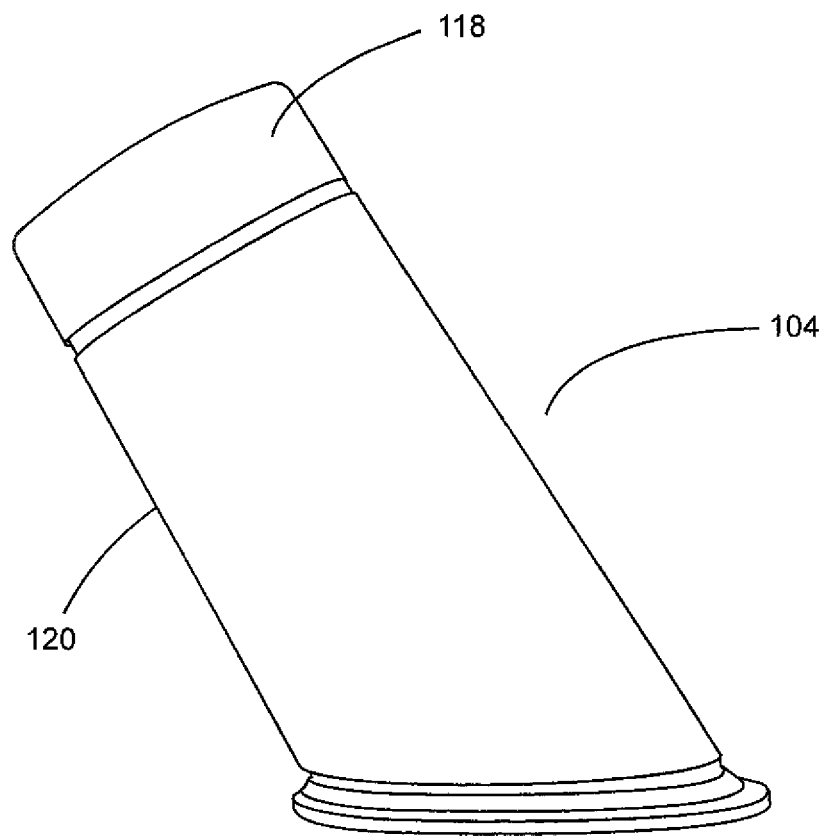
FIGS. 3A-3E show example views of various additional aspects of an example embodiment of a product merchandising system.
Figure 3B:
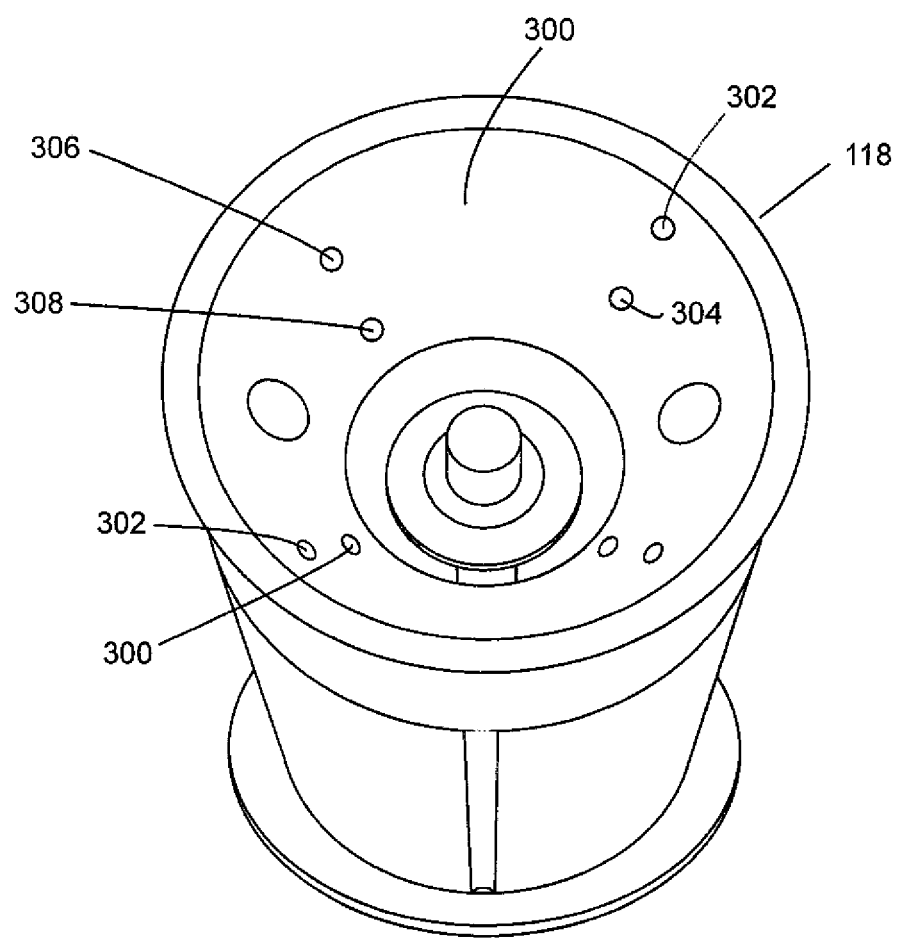

In another example embodiment, these power and data interfaces can take the form of conductive contacts as shown by FIGS. 2A, 2D and 3B. For example, FIGS. 2A and 2D show that the frustoconical portion of second portion 114 includes a first conductive contact ring 202 and a second conductive contact ring 204 that serve as power and ground contacts respectively. By forming a continuous loop around a perimeter of the frustoconical portion, the conductive contact rings 202 and 204 can permit power transfer to occur when the puck assembly 102 is in the rest position at any rotational orientation of the puck assembly 102 relative to the base assembly 104. FIGS. 2A and 2D also show that the frustoconical portion of second portion 114 includes a third conductive contact ring 206 and a fourth conductive contact ring 208 that serve as data contacts. By forming a continuous loop around a perimeter of the frustoconical portion, the conductive contact rings 206 and 208 can permit data transfer to occur when the puck assembly 102 is in the rest position at any rotational orientation of the puck assembly 102 relative to the base assembly 104.

FIG. 3B shows an example of how corresponding conductive contacts can be positioned in the base assembly 104. Conductive contacts 302 and 304 can serve as power contacts for engaging with the conductive contact rings 202 and 204 when the puck assembly 102 is in the rest position. Conductive contacts 306 and 308 can serve as data contacts for engaging with conductive contact rings 206 and 208 when the puck assembly 102 is in the rest position. Base assembly 104 can include a recess that is shaped to accommodate the frustoconical portion of the puck assembly 102 when the puck assembly is seated on the base assembly 104 in the rest position (e.g., the recess can exhibit a frustoconical shape that corresponds to the frustoconical shape of the puck assembly portion). Conductive contacts 302, 203, 306, 308 can take the form of individual contacts at discrete points on the base assembly recess surface. For example, conductive contacts 302, 203, 306, 308 can be spring contacts that extend from a surface in the recess of the base assembly 104 (e.g., pogo pin contacts). However, a practitioner may choose to implement conductive contacts 302, 203, 306, 308 as conductive contact rings (in which case the puck's conductive contacts may be individual contacts at discrete points on the frustoconical puck portion surface). The conductive contacts can be disposed within the recess 300 in a pattern where there can be 2 conductive contacts for each contact ring on the puck assembly 102.

While FIGS. 2A-2D show an example frustoconical shape for the puck assembly 102 lower portion that is continuously linear in profile, it should be understood that other shapes can be employed, including other shapes that still exhibit an overall frustoconical shape. For example, the puck assembly lower portion can be piecewise linear such that it exhibits terraces that conform to an overall frustoconical shape. Conductive contact rings can then be located on different terraces for engagement with corresponding contacts in a similarly terraced recess of the base assembly 104.

To permit rotatability of the puck assembly 102 relative to the base assembly 104, the second portion 114 and/or fitting 126 can include a swivel. Such a swivel can permit rotation of the puck assembly 102 not only when the puck assembly 102 is in the lift position, but it can also permit rotation of the puck assembly 102 relative to the base assembly 104 when the puck assembly 102 is seated on the base assembly 104 in the rest position. Furthermore, if the power and data interfaces employ conductive contact rings as noted above, the power and data connections between the puck assembly 102 and base assembly 104 can be maintained while the puck assembly 102 rotates relative to the base assembly 104 with the puck assembly 102 in the rest position.

Also, the port 220 can interact with cable 116 and first portion 110 when first portion 110 is detachably connected with second portion 114 to mechanically hinder disconnection of cable 116 from port 220 (see FIG. 2C). For example, the first portion 110 can include an overmold or extension that partially blocks the connector of cable 116 from being removed from port 220 when first portion 110 is detachably connected with second portion 114. In another example, the connector portion of cable 116 and first portion 110 can include corresponding recesses and projections (e.g., a recess on the connector of cable 116 and a projection on first portion 110 (or vice versa)) so that the cable 116 is mechanically locked in place in port 220 when first portion 110 is detachably connected with second portion 114 while cable 116 is connected to port 220.

Returning to FIGS. 1A and 1B, base assembly 104 can include components such as a riser assembly, where the riser assembly comprises a riser sleeve 120 that covers a riser 128. The base assembly 104 can also include a riser cup 118 that detachably connects with the riser assembly (e.g., connects with the riser sleeve 120 and/or riser 128). Riser 128 may be a support structure constructed from metal to provide strength for the base assembly 104. The base assembly 104 may also include a baseplate 130 through which the base assembly 104 is fixedly secured to a platform such as a display table or shelf (see also FIG. 3D). Riser 128 can be designed to be backwards compatible with older product merchandising systems so that it is capable of attaching to and detaching from the baseplates 130 of older product merchandising systems. Accordingly, if desired by a retailer, the same baseplate 130 that may have been fixedly secured to a display table can be re-used with a new product merchandising system 100 for easier and lower cost installations.

Figure 3C:
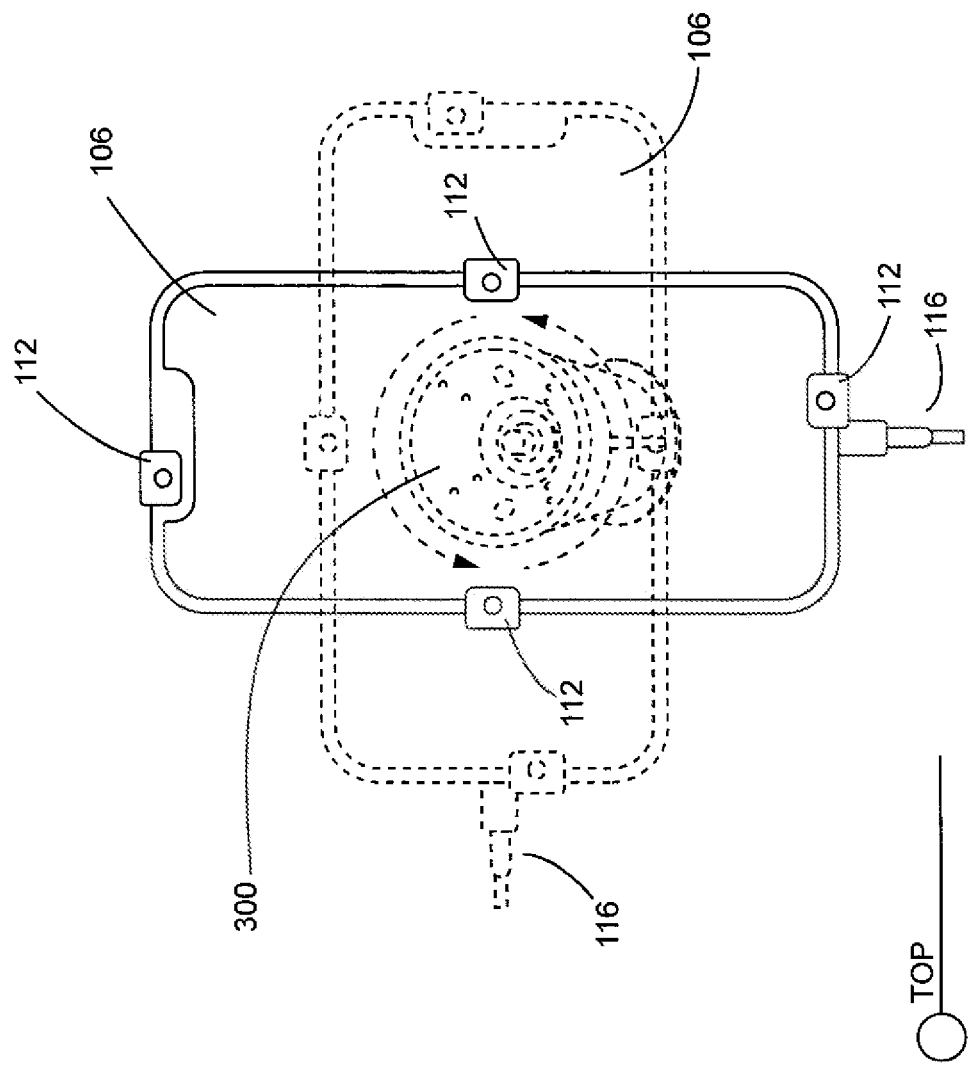
Figure 3D:
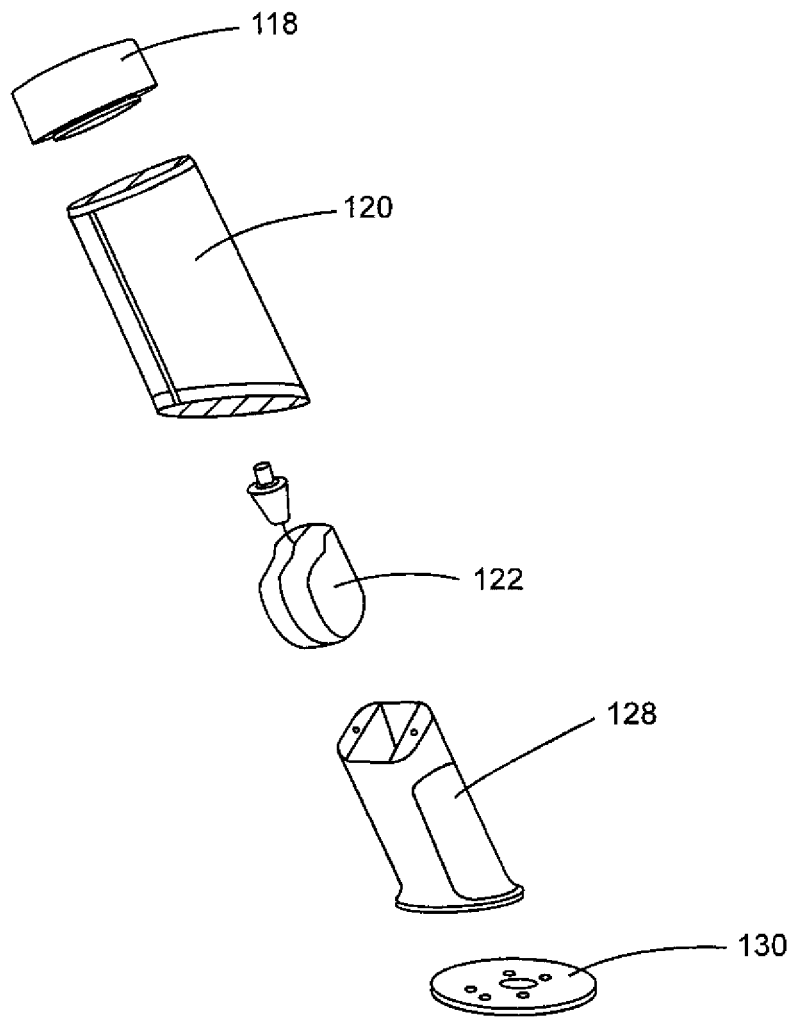

FIGS. 3A, 3B and 3D depict example views of the base assembly 104 that show an example embodiment of the riser cup 118 in greater detail. For example, FIG. 3A shows a side view of the base assembly 104. The riser cup 118 can detachably connect with the riser assembly in any of a number of ways. For example, the riser cup 118 and riser 128 can include threaded portions that allow the riser cup to be rotated onto the riser 128 in a screw-like fashion. Riser cup 118 may alternatively include apertures for receiving mounting screws that are screwed into place to connect the riser cup 118 to riser 128.

Riser cup 118 can exhibit a generally cylindrical shape formed by an outer ring. The riser cup 118 can also include a recess 300 in which a portion of the puck assembly 102 is seated when the puck assembly 102 is in the rest position. As an example, the recess 300 can have a frustoconical shape that generally corresponds to the frustoconical shape of the lower portion of second portion 114. Within the surface of this recess 300, the conductive contacts 302, 304, 306, and 308 can be positioned so that they will engage with the conductive contact rings 202, 204, 206, and 208 when the puck assembly 102 is in the rest position. In the example of FIG. 3B, two contacts can be included in the recess of the riser cup 118 for each contact ring of the puck assembly 102. Accordingly, each conductive contact ring of the puck assembly can engage with two contacts of the riser cup when the puck assembly 102 is in the rest position.

The riser cup 118 can also include a central aperture through which the tether 124 and fitting 126 can pass. Accordingly, in an example embodiment, a central region of the puck assembly 102 (e.g., see the lower portion of the second portion 114) and a central region of the base assembly 104 (e.g., see the central aperture of riser cup 118) can be used for a tethering connection, and they are not used as conductive contact regions for transferring power and/or data from the base assembly 104 to the puck assembly 102. Further still, the riser cup 118 may include one or more magnets for facilitating an alignment with corresponding metallic elements in the puck assembly 102 (e.g., metallic elements in second portion 114 of the puck assembly 102) (where such metallic elements may themselves be magnets). For example, magnets can be placed in the riser cup 118 at 90 degree offsets around the perimeter of the riser cup 118 for registering with corresponding metallic elements in the puck at 90 degree increments (e.g., see FIG. 3C).

Further still, the riser cup 118 can take the form of a swivel riser cup that permits rotation of the puck assembly relative to the base assembly when the puck assembly is in the rest position. For example, the outer ring of the riser cup 118 can define a sliding path for rotation of the cup that defines recess 300. The riser cup 118 can include a lower cup and an upper cup. The upper cup can include the contacts 302, 304, 306, and 308, and the upper cup can be seated on the lower cup and bounded by the outer ring. Upper cup would be capable of rotating within the outer ring. Lower cup can include conductive rings that maintain contact with the contacts 302, 304, 306, and 308 while the upper cup is rotating so that the power and data connections can be maintained during the swivel action of the riser cup 118. Brushes and/or ball bearings can be included to facilitate the swivel action while maintaining the power and data connections as between the upper cup and lower cup.

Riser 128 can include a tether lock that can be actuated to engage with the tether assembly 122 to restrict extension and retraction of the tether 124 when the lock is in a locked state. When the tether lock is actuated to be in an unlocked state, the lock disengages from the tether assembly 122 to permit extension and retraction of the tether 124. Accordingly, the tether lock can control whether a customer is able to lift the puck assembly 102 from the rest position.

Figure 3E:
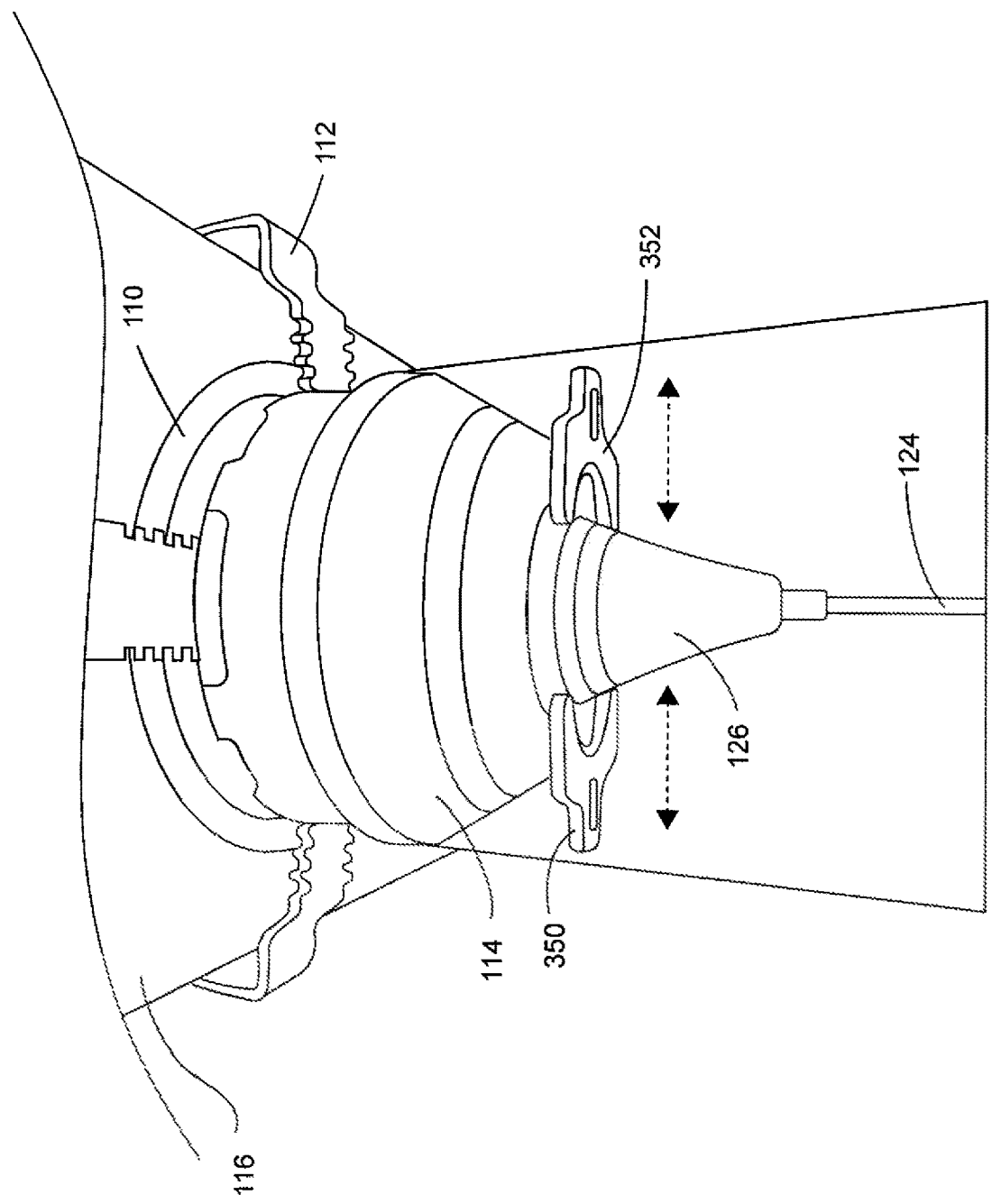

The tether lock can take the form of one or more clamps 350/352 that are controllably positioned to clamp onto the fitting 126 when the lock is in the locked state. This clamp, when in the locked position, can collar a neck of the fitting 126 to block lifting action of the puck assembly 102 that is connected to the fitting 126 of the tether assembly 122 (thereby "locking down" the puck assembly 102). When in the unlocked position, the clamp will no longer collar the neck of the fitting 126, thereby freeing the tether assembly 122 so that the puck assembly 102 can be lifted from the base assembly 104. An example of such an arrangement is shown by FIG. 3E.

A motor such as a servo motor can drive the clamps 350/352 into a locked state or an unlocked state based on a signal from a control circuit. Such control circuit in turn can generate the control signal for the lock based on a command received from a remote computer system or from a sensor circuit that authenticates a security fob carried by a store employee (e.g., an RFID card that is read by an RFID reader 210 which may be located in the puck assembly 102). In an example embodiment where the sensor circuit is located in second portion 114, a command to control the clamps 350/352 can be passed to the control circuit in the base assembly 104 via the engagement of the contact rings 206/208 with contacts 306/308 when the puck assembly 102 is in the rest position. In this fashion, the tether lock can be RFID-activated via RFID reader 210. In an example embodiment where the puck assembly 102 and/or base assembly 104 include a wireless transceiver that provides wireless connectivity with a remote computer system, a command to control the claims 350/352 can be passed to the control circuit in the base assembly 104 via such wireless transceiver(s). While a motor can be used to actuate the tether lock, it should be understood that other techniques could be employed to actuate the tether lock if desired by a practitioner, such as memory wire, electromagnets, etc.

Furthermore, as noted above, the fitting 126 and/or puck assembly 102 can include a swivel that permits the puck assembly 102 to rotate relative to the tether 124. This swivel can be internal to the fitting 126 so that the engagement of clamps 350/352 onto the fitting 126 does not hinder the rotatability of the puck assembly 102 even when the clamps 350/352 are locked onto the fitting 124 to prevent extension/retraction of the tether 124.

Riser 128 can include one or more access ports for a user to interact with interior of the riser 128 and/or disconnect components from the riser 128. For example, screw holes may be present on an exterior surface of the riser 128 to permit connecting the tether assembly 122 to the riser 128. Riser sleeve 120 can be fitted over the exterior surface of the riser 128 so that all access ports to the interior of the riser 128 are blocked. In this fashion, riser sleeve 120 can help prevent bad actors from interfering with the riser 128 and internal components such as tether assembly 122. Riser sleeve 120 can be shaped to slide over riser 128 when riser cup 118 is disconnected from the riser 128. When riser cup 118 is then detachably connected with the riser 128, the riser cup 118 can lock the riser sleeve 120 into place covering the riser 128. Furthermore, riser 128 can be adapted with an opening at the top for accessing, inserting, and/or removing the tether assembly 122 to/from the riser 128 (see, e.g., FIG. 3D). Riser 128 can also include a circuit board the receives a power input from an external source such as a power outlet (either directly via a cable connection from the riser circuit board into the power outlet or indirectly via a power adapter that connects the power outlet with the riser circuit board). The riser circuit board can then pass power to the puck assembly 102 via the power interface as discussed above. Riser 128 may also optionally include a wireless transceiver that provides wireless connectivity with a remote computer system using techniques as described in the above-referenced and incorporated U.S. Pat. App. Pub. Nos. 2017/0164314, 2018/0007648, 2018/0288720, 2018/0288721, and 2018/0288722.

Through the wireless connectivity with the remote computer system that can be achieved via a wireless transceiver in the puck assembly 102 and/or base assembly 104, many aspects of the operation of system 100 can be controlled from the remote computer system. For example, a wireless transceiver in the puck assembly 102 and/or base assembly 104 can receive a software or firmware upgrade for software or firmware in the puck assembly 102 and/or base assembly 104. This allows for remote updating of system 100. If the wireless transceiver with connectivity to the remote computer system is located in the base assembly 104 and the software or firmware to be upgrade is located in the puck assembly 102, the software/firmware update can be passed from the base assembly 104 to the puck assembly 102 via the data interface when the puck assembly 102 is in the rest position.

In another example embodiment, software or firmware upgrades can be passed into the system 100 via the sensor circuit such as RFID reader 210 on the puck assembly 102. As an example, a security fob can carry data that constitutes the software/firmware upgrade (e.g., a special RFID card that encodes the software/firmware upgrade). When the sensor circuit detects such a security fob, the circuitry in the puck assembly's second portion 114 can read the updated software/firmware and load it into memory in order to update the system.

However, it should be understood that data other than software and firmware upgrades can be communicated to the system 100 from remote computer system. For example, the remote computer system can wirelessly send arm/disarm commands, lock/unlock commands, status check commands (e.g., commands that poll the system to identify various components of the system 100 (which may including requesting an identifier for product 106), commands that poll the system for operating status (e.g., temperature, charge level, etc.). Communications that are internal to the system 100 may be carried out via the data interface when the puck assembly 102 is in the rest position if necessary.

Accordingly, system 100 supports the ability of the remote computer system to track the components that make up system 100. For example, the system 100 can support electronic serialization operations. Different components of the system 100 can be associated with identifiers for those components.

For example, puck assembly 102 can be associated with an identifier that identifies the features and capabilities of the puck assembly 102. For example, the puck assembly identifier can encode information that indicates a version number for any software or firmware in the puck assembly 102. The puck assembly identifier can also encode information that identifies whether the puck assembly 102 includes a wireless transceiver that provides wireless connectivity with a remote computer system. The puck assembly identifier can also encode information that identifies whether the puck assembly 102 includes a sensor circuit such as an RFID reader 210. The puck assembly identifier can also encode information that identifies a protocol supported by the puck assembly 102 via port 220 for connectivity of cable 116 with product 106. The puck assembly identifier can also encode information that identifies an alarm capability for alarm elements of the puck assembly (e.g., a decibel capability for an audio alarm component).

As another example, the base assembly 104 can be associated with an identifier that identifies the features and capabilities of the base assembly 104. For example, the base assembly identifier can encode information that indicates a version number for any software or firmware in the base assembly 104. The base assembly identifier can also encode information that identifies whether the base assembly 104 includes a wireless transceiver that provides wireless connectivity with a remote computer system. The base assembly identifier can also encode information that identifies whether the base assembly 104 includes a sensor circuit such as an RFID reader for access control of the system 100.

The wireless transceiver can collect such identifiers from the system components and wirelessly transmit them to the remote computer system. For example, a processor resident in the puck assembly 102 and/or base assembly 104 can report out the identifying information about the components and capabilities of that particular puck assembly 102 and/or base assembly 104 to the wireless transceiver, whereupon the wireless transceiver wireless transmits such identifying information to the remote computer system (e.g., via a wireless network such as a wireless mesh network as described in the above-referenced and incorporated U.S. Pat. App. Pub. Nos. 2017/0164314, 2018/0007648, 2018/0288720, 2018/0288721, and 2018/0288722. The processor(s) can perform such reporting on a push or pull basis (e.g., where the processor(s) periodically push this information to the wireless transceiver or where the wireless transceiver periodically polls the processor(s) for this information). The remote computer system, in turn, can build a record that tracks the components and capabilities of the system 100. Moreover, the remote computer system can do this for multiple systems 100 in a retail store (or in multiple retail stores). In this fashion, the remote computer system can closely track which components of system 100 may be outdated, in need of replacement, etc. Through such information, the remote computer system can determine, either directly or indirectly, a number of pieces of information about each system 100—with examples being when a component was built, where a component was built (which can be useful for quality control purposes), when a component was sold, when a component was installed and/or activated, whether a warranty exists and if so, how much time may be left on the warranty, and/or whether any components have been altered, etc. FIG. 16 shows an example process flow for wirelessly tracking the components and capabilities of multiple systems 100.

Based on the tracked information, users can make a variety of operations management decisions, such as whether any maintenance work or upgrades are needed. For example, the tracked information can permit a user to quickly identify whether a software or firmware upgrade is needed. Moreover, a user interface accessible through the remote computer system (e.g., a GUI accessible via a tablet computer) can be used by a system user to remotely initiate a software/firmware upgrade. For example, in response to input via the user interface, a software/firmware upgrade command can be wirelessly transmitted to one or more designated product merchandising systems 100. This command may also include the upgrade itself. The wireless connectivity and remote control features described in the above-referenced and incorporated U.S. Pat. App. Pub. Nos. 2017/0164314, 2018/0007648, 2018/0288720, 2018/0288721, and 2018/0288722 can then be used to update the designated system(s) 100 with the newer versions of software and/or firmware.

Figure 4:
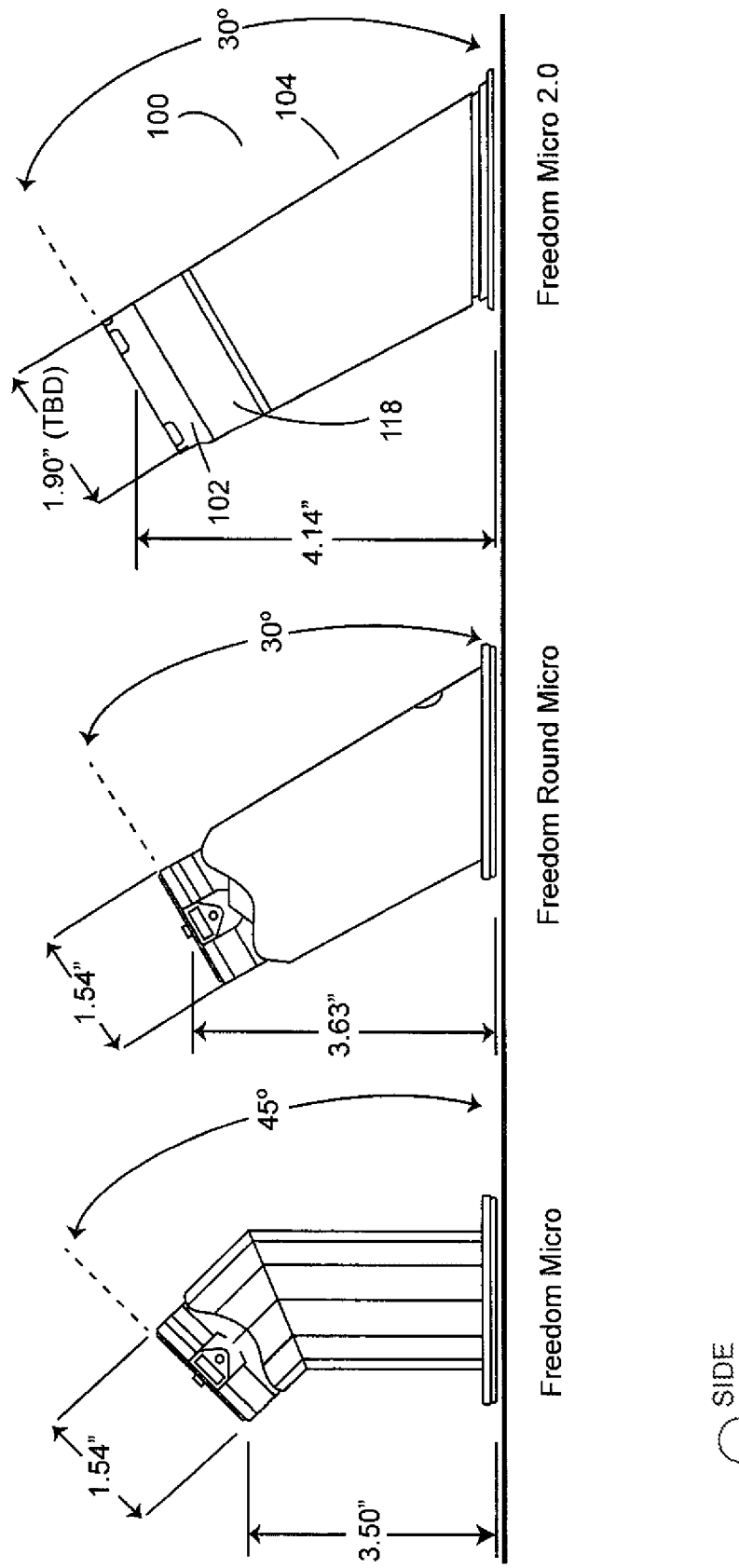
FIG. 4 shows example form factors for example embodiments of a product merchandising system.
Figure 5:
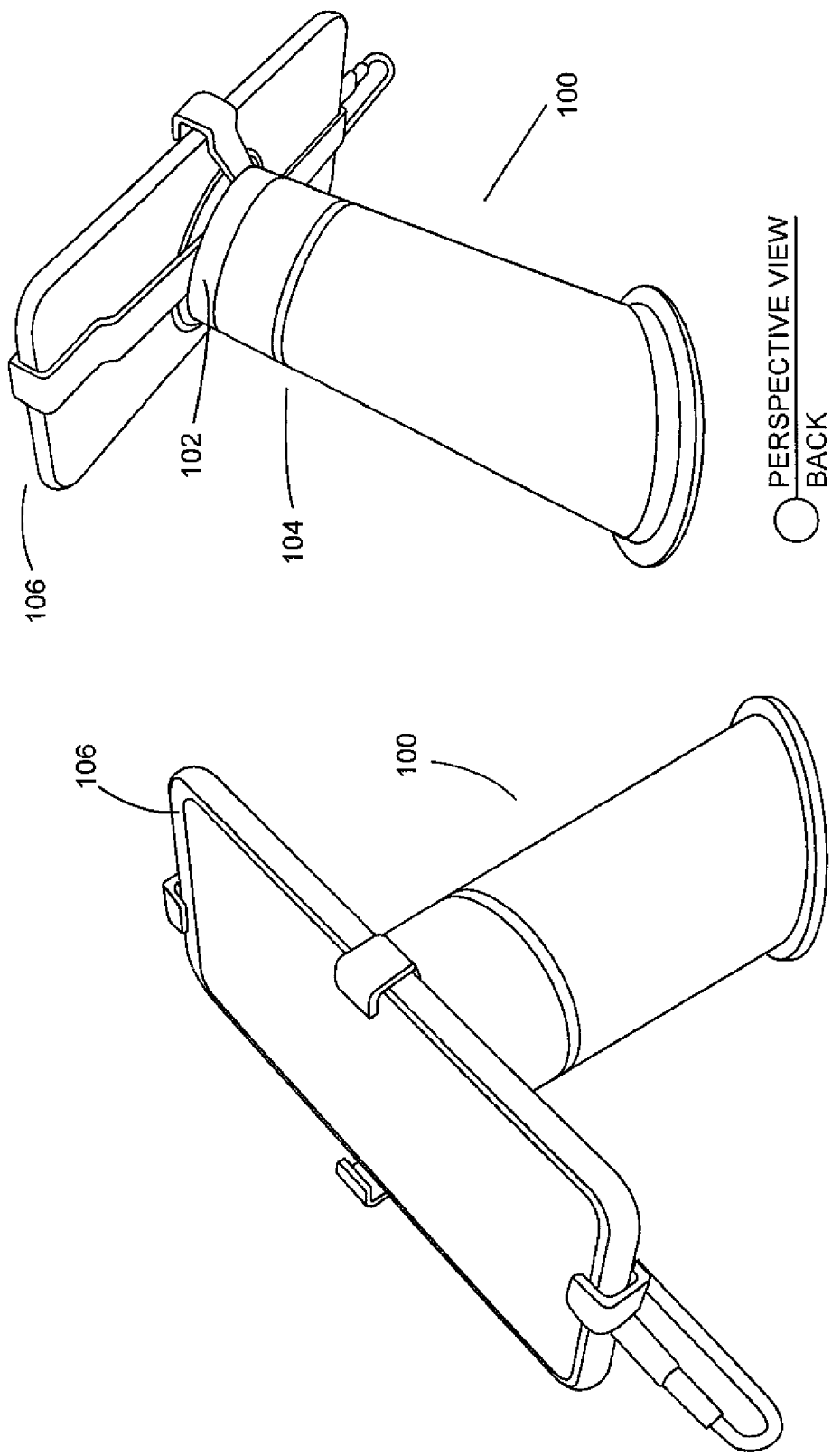
FIG. 5 shows additional example views of an example embodiment of a product merchandising system.
Figure 7:
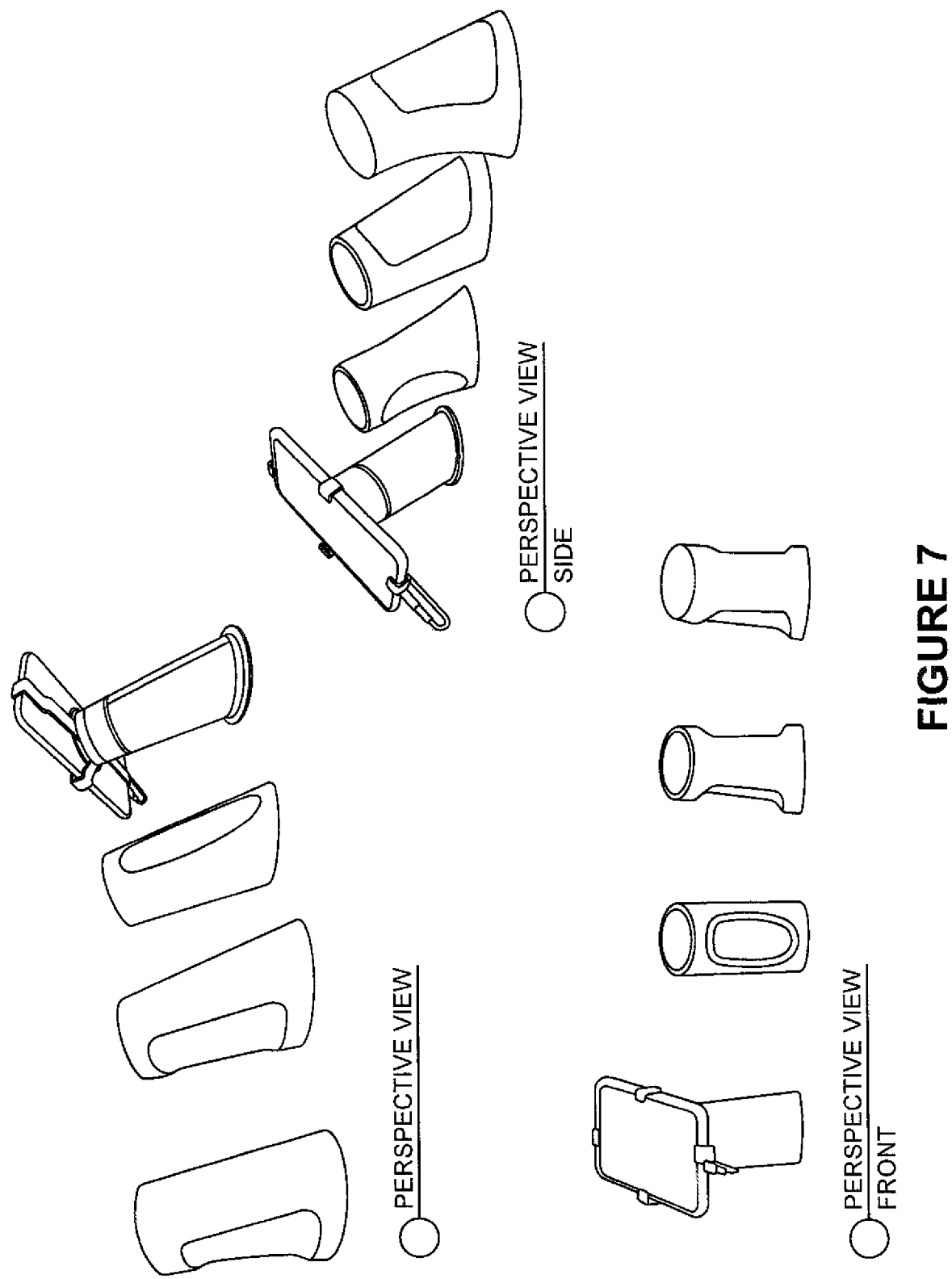
FIG. 7 shows additional example form factors for example embodiments of a product merchandising system.
Figure 8:
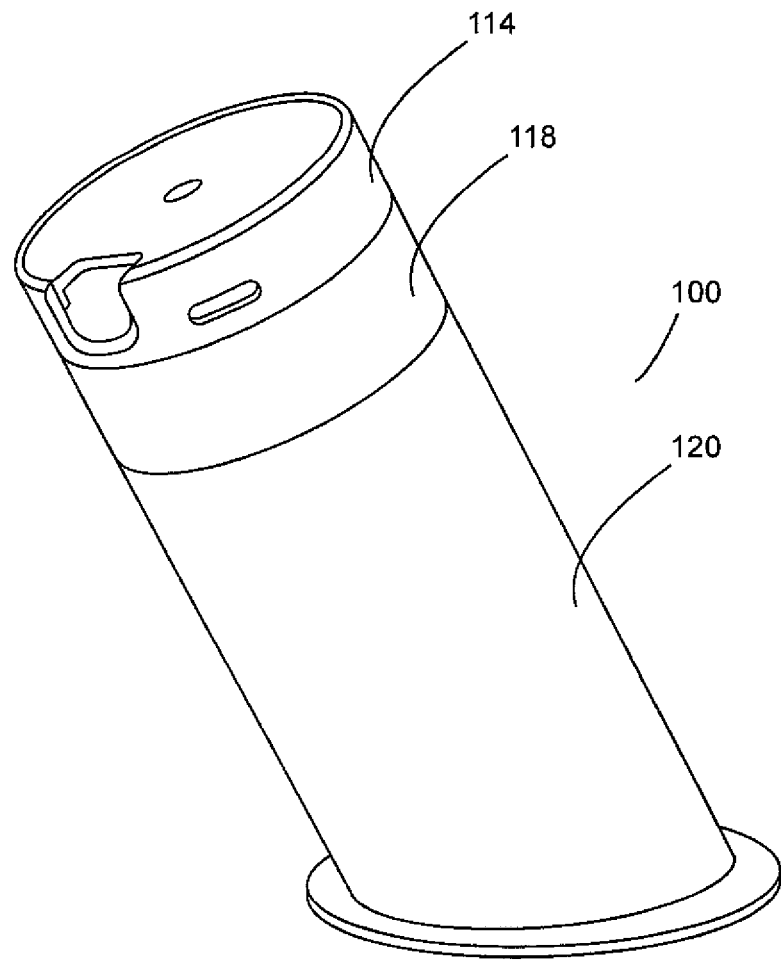
FIGS. 8-15 show additional example views of example embodiments of a product merchandising system and components thereof.
Figure 9:
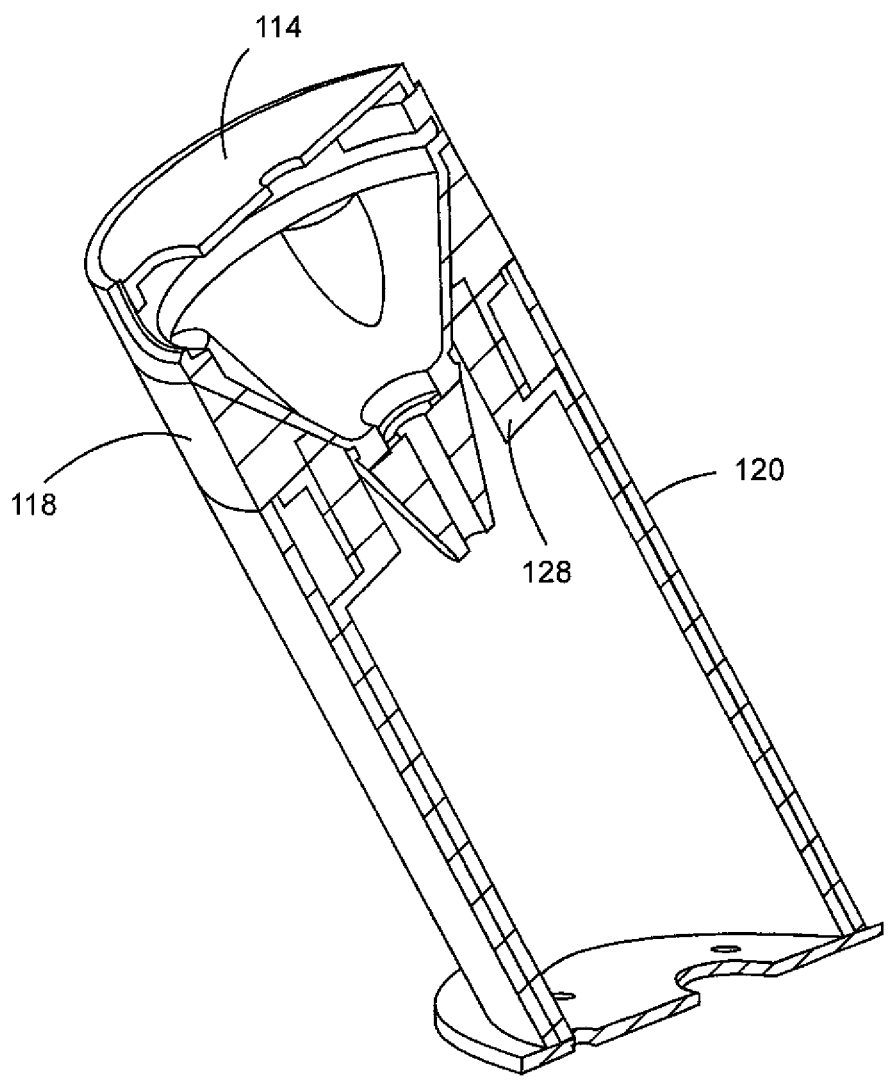
Figure 10:
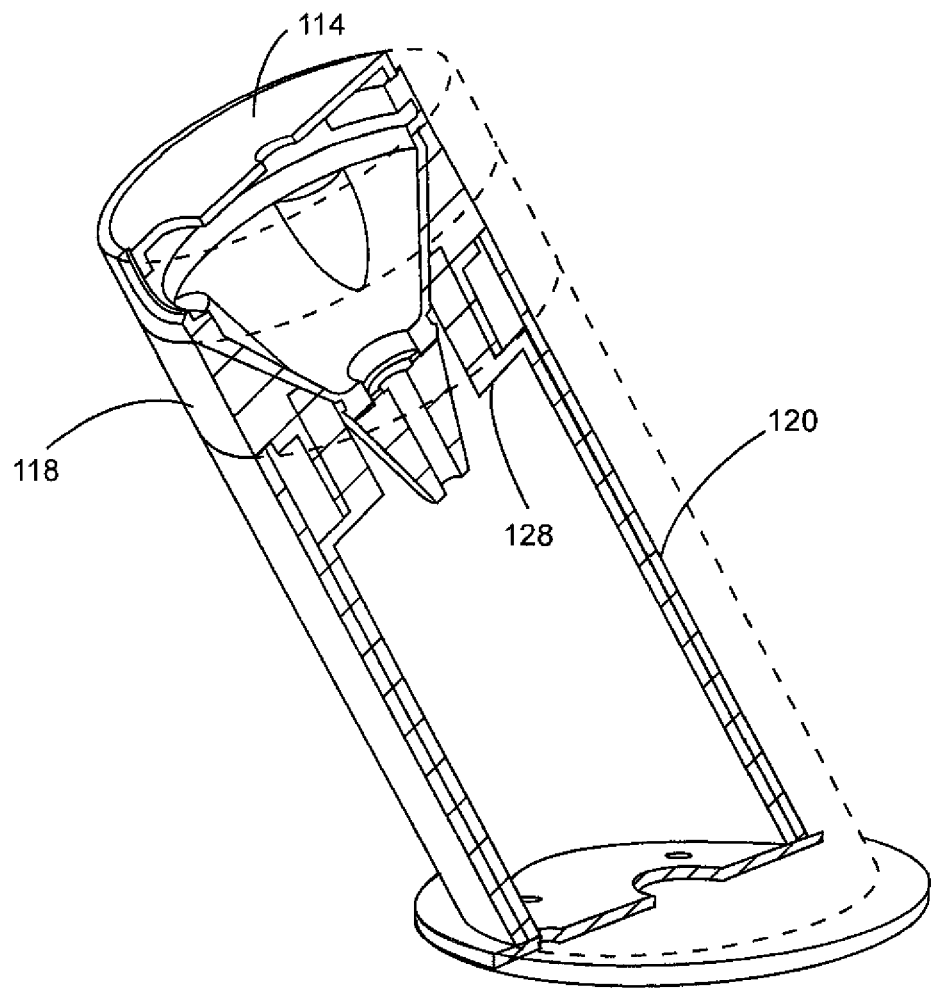
Figure 11:
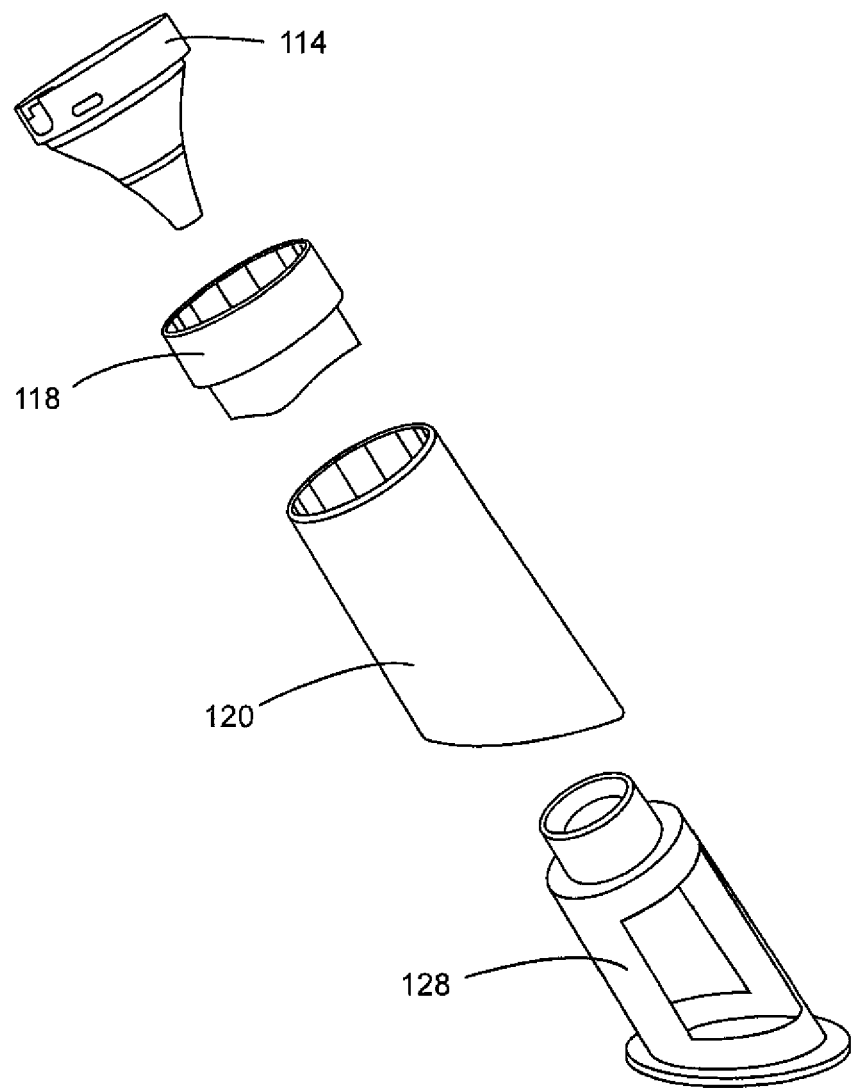
Figure 12:
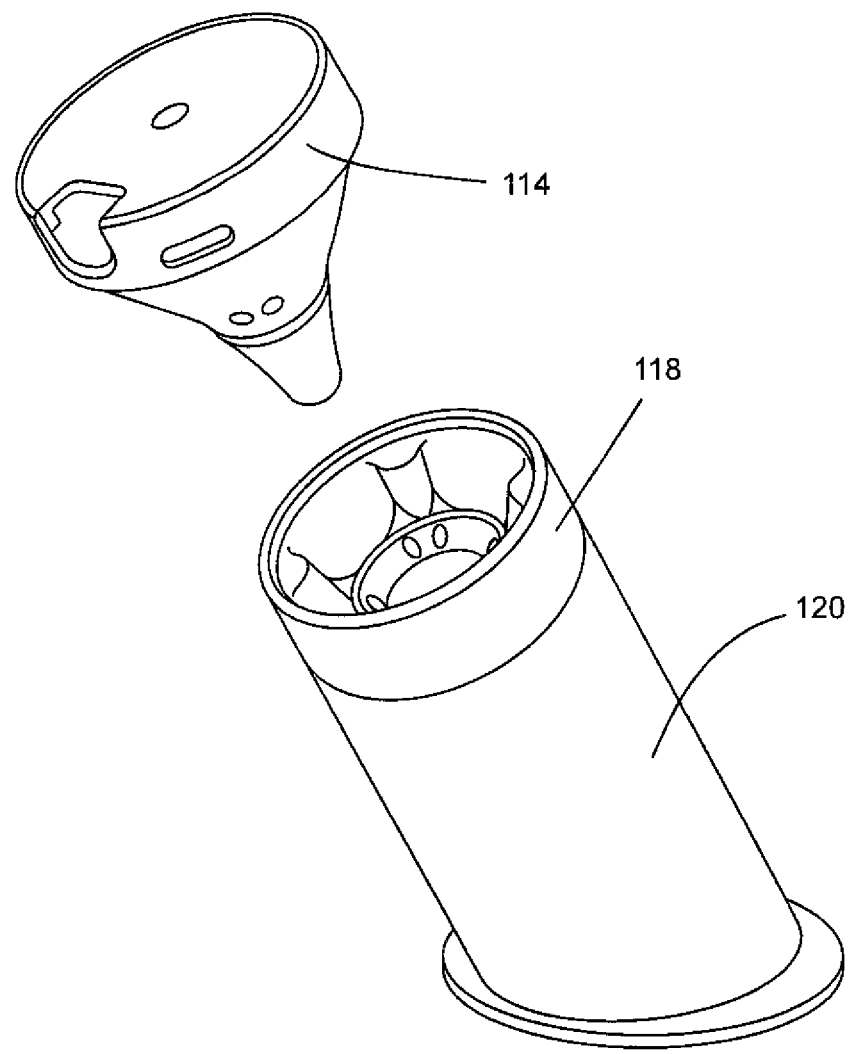
Figure 13:
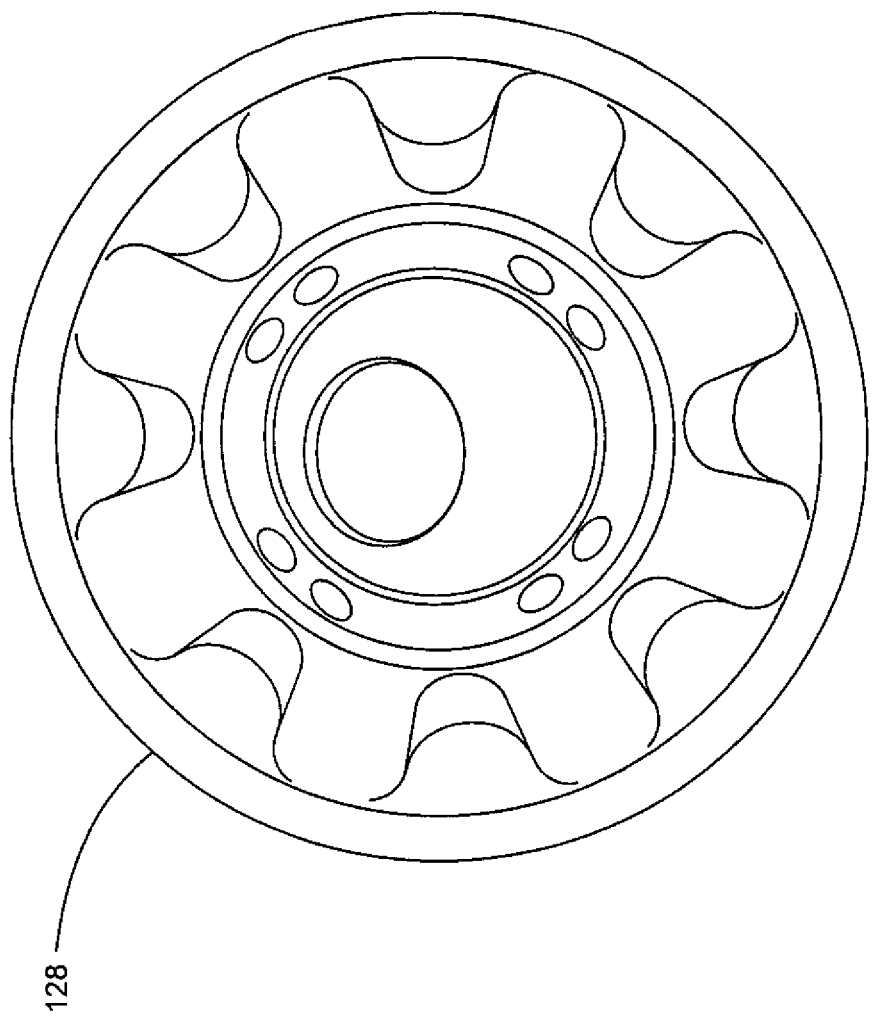
Figure 14:
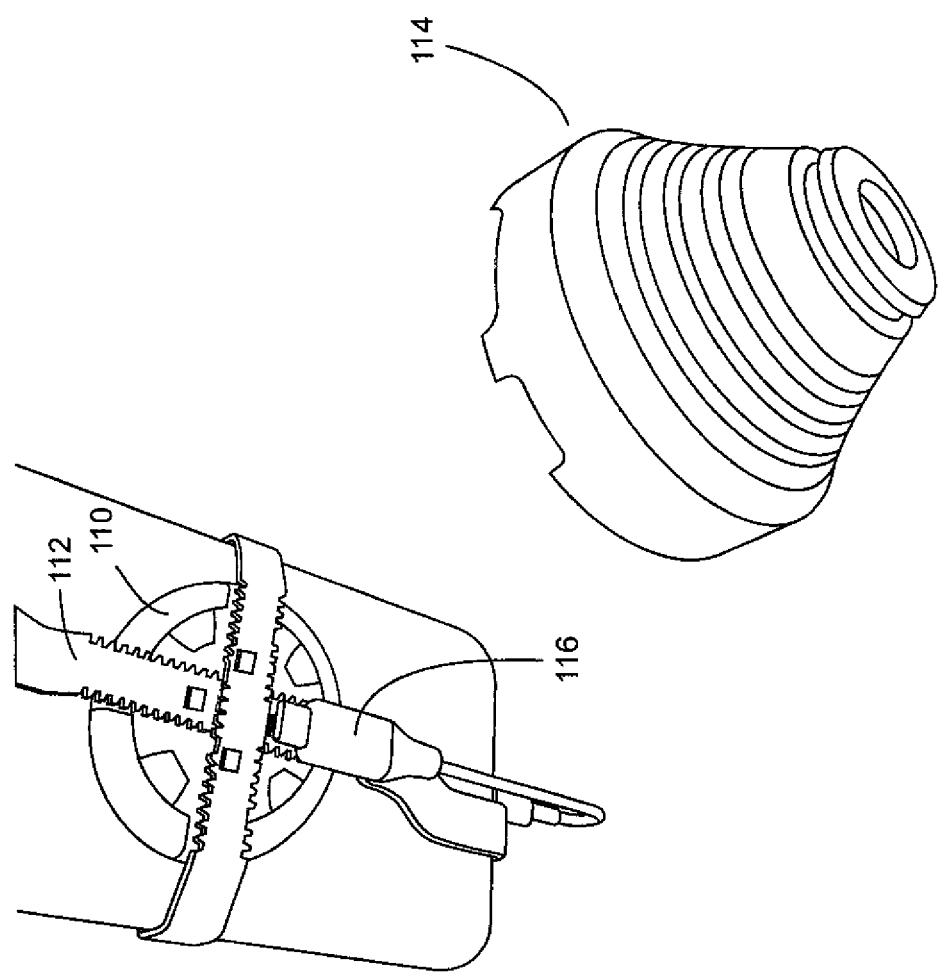
Figure 15:
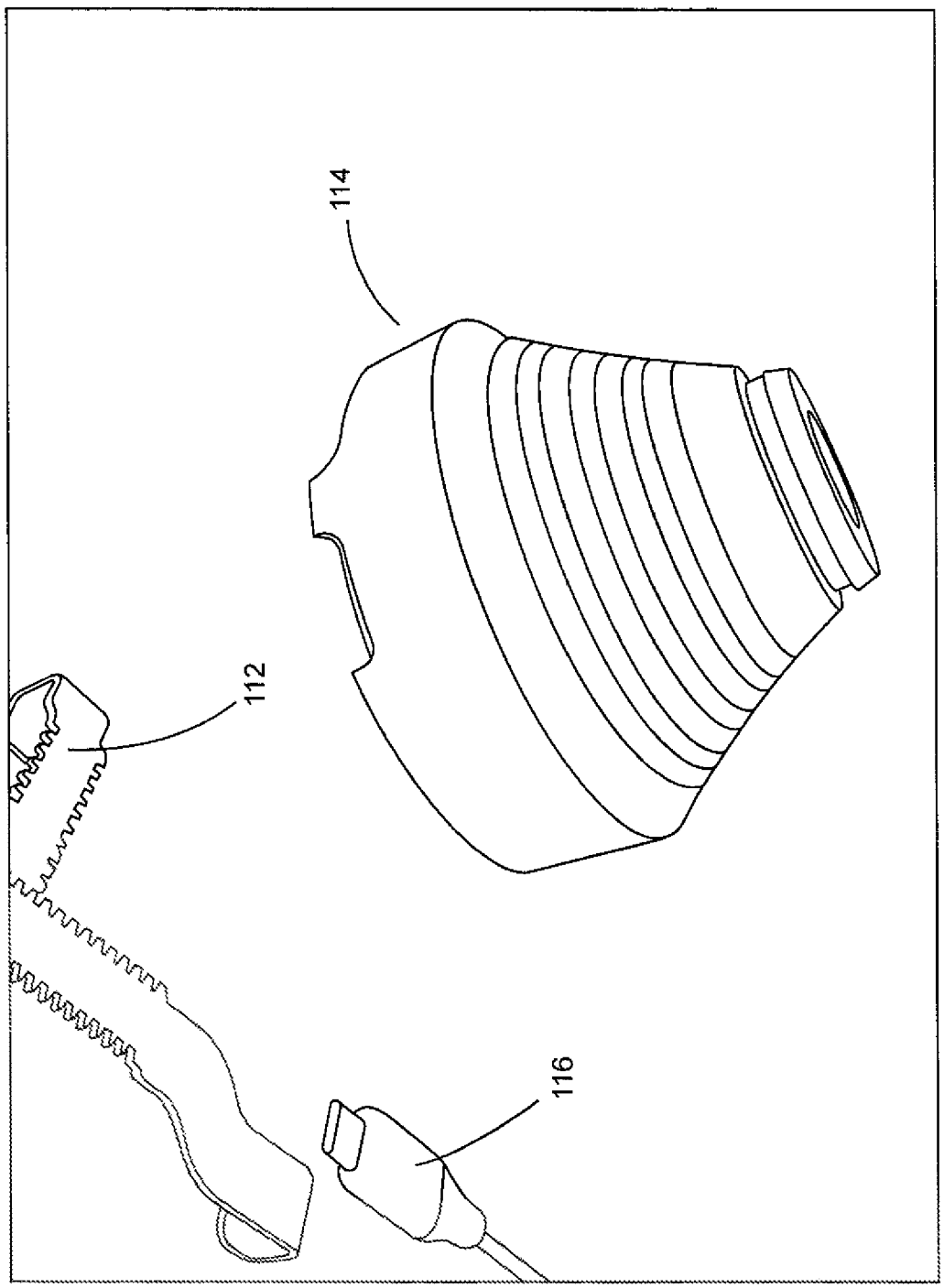

FIG. 4 depict examples of different form factors and dimensions that can be used for example embodiments of system 100. FIG. 5 shows additional example perspective views for an example embodiment of system 100, where product 106 is mounted onto the puck assembly 102, and the puck assembly 102 is in the rest position on the base assembly 104. FIG. 6 shows additional example perspective views for an example embodiment of system 100, where product 106 is mounted onto the puck assembly 102, and the puck assembly 102 is in the lift position. In the example of FIG. 6, the system 100 does not include a tether assembly 122, although it should be understood that a practitioner may choose to employ a tether assembly 122 that tethers the puck assembly 102 to the base assembly 104 via a retractable tether. FIG. 7 shows various examples of form factors that can be used for the base assembly 104, such as design features for the riser sleeve 120. FIGS. 8-15 show additional example views of example embodiments of a product merchandising system 100 and components thereof. For example, FIG. 8 provides a perspective view of an example system 100. FIG. 9 shows a cross-sectional view of the system 100 of FIG. 8. FIG. 10 shows the cross-sectional view of FIG. 9, with outer sections shown as translucent. FIG. 11 provides an exploded view of the system of FIG. 8. FIG. 12 provides a view of the system 100 of FIG. 8 where the puck assembly 102 has been lifted from the base assembly 104. FIG. 13 provides a view down into the top of the base assembly 104 when the puck assembly 102 has been removed therefrom. FIG. 14 shows an underside perspective view of the puck assembly 102's lower portion 114 separated from a bracket 112 and first portion 110 (as well as the product mounted on first portion 110 and bracket 112). FIG. 15 shows an underside perspective view of the puck assembly 102's lower portion 114 separated from a bracket 112 and a portion of the power cable 116.

While the invention has been described above in relation to its example embodiments, various modifications may be made thereto that still fall within the invention's scope. Such modifications to the invention will be recognizable upon review of the teachings herein.

What is claimed is:

1. A tracking system for electronically tracking a plurality of components of a product merchandising display system, the tracking system comprising:
the product merchandising display system, wherein the product merchandising display system comprises (1) a puck assembly for mounting a product, and (2) a base assembly, wherein the puck assembly comprises a first interface, wherein the base assembly comprises a second interface, wherein the puck assembly is moveable between (1) a rest position in which the puck assembly rests on the base assembly and (2) a lift position in which the puck assembly is lifted from the base assembly, and wherein the first and second interfaces are positioned to engage with each other when the puck assembly is in the rest position to provide a path for a data transfer between the base assembly and the puck assembly, the product merchandising system further comprising a wireless transceiver; and
a computer system remote from the product merchandising system;
wherein wireless transceiver is configured to (1) collect an identifier for the puck assembly and an identifier for the base assembly, and (2) wirelessly communicate the collected identifiers to the remote computer system.

2. The tracking system of claim 1 wherein the wireless transceiver is located in the puck assembly; and
wherein the base assembly is configured to communicate the base assembly identifier to the puck assembly via the data transfer path when the puck assembly is in the rest position.

3. The tracking system of claim 1 wherein the wireless transceiver is located in the base assembly; and
wherein the puck assembly is configured to communicate the puck assembly identifier to the base assembly via the data transfer path when the puck assembly is in the rest position.

4. The tracking system of claim 1 wherein the puck assembly identifier comprises data that indicates a plurality of feature capabilities of the puck assembly; and
wherein the puck assembly identifier data comprises data indicative of a software or firmware version for software or firmware on the puck assembly.

5. The tracking system of claim 1 wherein the base identifier comprises data that indicates a plurality of feature capabilities of the base assembly; and
wherein the base assembly identifier data comprises data indicative of a software or firmware version for software or firmware on the base assembly.

6. The tracking system of claim 1 wherein the remote computer system is configured to maintain a record of the puck and base assembly identifiers for the product merchandising display system; and
wherein the remote computer system is further configured to determine, based on the data structure, whether a component of a product merchandising system has been altered.

7. The tracking system of claim 1 wherein the remote computer system is further configured to generate and wirelessly transmit a command to the product merchandising system to upgrade software or firmware on the product merchandising system to a new version; and
wherein the remote computer system includes a tablet computer with a graphical user interface through which a user initiates the command.

8. A method for electronically tracking a plurality of components of a product merchandising display system, wherein the product merchandising display system comprises (1) a puck assembly for mounting a product, and (2) a base assembly, wherein the puck assembly comprises a first interface, wherein the base assembly comprises a second interface, wherein the puck assembly is moveable between (1) a rest position in which the puck assembly rests on the base assembly and (2) a lift position in which the puck assembly is lifted from the base assembly, and wherein the first and second interfaces are positioned to engage with each other when the puck assembly is in the rest position to provide a path for a data transfer between the base assembly and the puck assembly, the method comprising:
a wireless transceiver in the system collecting an identifier for the puck assembly and an identifier for the base assembly and wirelessly communicating the collected identifiers to a remote computer system.

9. The method of claim 8 wherein the puck assembly identifier comprises data that indicates a plurality of feature capabilities of the puck assembly; and
wherein the puck assembly identifier data comprises data indicative of a software or firmware version for software or firmware on the puck assembly.

10. The method of claim 8 further comprising:
the remote computer system maintaining a record of the puck and base assembly identifiers for the product merchandising display system.

* * * * *